United States Patent
Lee et al.

(10) Patent No.: US 11,363,582 B2
(45) Date of Patent: Jun. 14, 2022

(54) KEY PROVISIONING FOR BROADCAST CONTROL CHANNEL PROTECTION IN A WIRELESS NETWORK

(71) Applicant: QUALCOMM Incorporated, San Diego, CA (US)

(72) Inventors: Soo Bum Lee, San Diego, CA (US); Gavin Bernard Horn, La Jolla, CA (US); Ravi Agarwal, San Diego, CA (US); Ozcan Ozturk, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/723,783

(22) Filed: Dec. 20, 2019

(65) Prior Publication Data

US 2021/0195563 A1 Jun. 24, 2021

(51) Int. Cl.
*H04W 72/04* (2009.01)
*H04W 12/04* (2021.01)

(52) U.S. Cl.
CPC ......... *H04W 72/042* (2013.01); *H04W 12/04* (2013.01)

(58) Field of Classification Search
CPC . H04W 72/042; H04W 12/04; H04W 12/033; H04W 12/0433; H04W 88/16; H04W 12/10
See application file for complete search history.

(56) References Cited

U.S. PATENT DOCUMENTS

| | | | |
|---|---|---|---|
| 2003/0039361 A1 | 2/2003 | Hawkes et al. | |
| 2009/0240944 A1 | 9/2009 | Cho et al. | |
| 2010/0293370 A1 | 11/2010 | Xiao et al. | |
| 2011/0044455 A1* | 2/2011 | Huang | H04W 12/041 380/278 |
| 2012/0100833 A1* | 4/2012 | Gao | H04L 63/0823 455/411 |
| 2012/0129499 A1* | 5/2012 | Li | H04W 36/0038 455/411 |

(Continued)

FOREIGN PATENT DOCUMENTS

| | | |
|---|---|---|
| EP | 2273818 A1 | 1/2011 |
| WO | WO-9966670 A1 | 12/1999 |

OTHER PUBLICATIONS

International Search Report and Written Opinion—PCT/US2020/064295—ISA/EPO—dated Apr. 6, 2021.

*Primary Examiner* — Chi Ho A Lee

(74) *Attorney, Agent, or Firm* — Holland & Hart LLP

(57) ABSTRACT

Methods, systems, and devices for wireless communications are described. A user equipment (UE) may communicate with a base station in a wireless communications system. The base station may transmit signaling to the UE over a broadcast channel. The base station may transmit control signaling to the UE that indicates a broadcast root key. The UE may identify the broadcast root key for a wireless network corresponding to the base station. The base station may transmit an encrypted broadcast transmission. The UE may receive the encrypted broadcast transmission from the base station, and the UE may decrypt the encrypted broadcast transmission to obtain broadcast information based on a cell-specific key derived from the broadcast root key.

26 Claims, 17 Drawing Sheets

(56) References Cited

U.S. PATENT DOCUMENTS

| | | | | |
|---|---|---|---|---|
| 2012/0157053 A1* | 6/2012 | Iwamura | ............. | H04W 12/041 |
| | | | | 455/411 |
| 2012/0251362 A1* | 10/2012 | Forsberg | .................. | F04D 1/06 |
| | | | | 417/423.12 |
| 2014/0141763 A1* | 5/2014 | Suh | .................... | H04L 41/0806 |
| | | | | 455/418 |
| 2014/0237559 A1* | 8/2014 | Zhang | ................... | H04L 63/062 |
| | | | | 726/4 |
| 2014/0355762 A1* | 12/2014 | Zhang | ................... | H04L 9/0816 |
| | | | | 380/270 |
| 2015/0312575 A1* | 10/2015 | Bryant | ................. | H04N 19/182 |
| | | | | 375/240.08 |
| 2015/0312757 A1* | 10/2015 | Wang | ................ | H04W 12/0431 |
| | | | | 370/254 |
| 2017/0041815 A1* | 2/2017 | Fernandez Arboleda | ................... | |
| | | | | H04W 24/04 |
| 2017/0311374 A1* | 10/2017 | Chang | ............... | H04W 36/0069 |
| 2018/0367303 A1* | 12/2018 | Velev | .................. | H04W 12/122 |
| 2019/0014471 A1* | 1/2019 | Saily | .................... | H04W 12/04 |
| 2019/0053049 A1* | 2/2019 | Kunz | ................... | H04W 12/04 |
| 2019/0082367 A1* | 3/2019 | Lin | ..................... | H04W 12/041 |
| 2020/0213111 A1* | 7/2020 | Leavy | ....................... | H04L 9/14 |
| 2020/0213918 A1* | 7/2020 | Krishnan | ........... | H04W 36/0083 |
| 2020/0396605 A1* | 12/2020 | Torvinen | ............... | H04W 12/10 |
| 2021/0204181 A1* | 7/2021 | Chen | .................... | H04W 12/037 |

\* cited by examiner

KEY PROVISIONING FOR BROADCAST CONTROL CHANNEL PROTECTION IN A WIRELESS NETWORK

FIELD OF TECHNOLOGY

The following relates generally to wireless communications and more specifically to key provisioning for broadcast control channel protection in a wireless network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In wireless communications system, broadcast communications over a broadcast channel may not be secured, and may therefore be vulnerable to attacks. Jamming or manipulating the broadcast channel may cause denial of service or a service downgrade to one or more UEs.

SUMMARY

The described techniques relate to improved methods, systems, devices, and apparatuses that support key provisioning for broadcast control channel protection in a wireless network. Generally, the described techniques provide for encrypting and decrypting broadcast communications using a cell-specific root key. A user equipment (UE) may communicate with a base station in wireless communications system. The base station may communicate with one or more UEs using broadcast messaging in a broadcast channel. The base station may transmit control signaling to the UE over the broadcast channel that indicates a broadcast root key. The UE may identify the broadcast root key for a wireless network corresponding to the base station. The base station may transmit an encrypted broadcast transmission to the UE over the broadcast channel. The UE may receive the encrypted broadcast transmission from the base station, and the UE may decrypt the encrypted broadcast transmission to obtain broadcast information based on a cell-specific key derived from the broadcast root key.

A method of wireless communications by a UE is described. The method may include identifying a broadcast root key for a wireless network, receiving an encrypted broadcast transmission from a base station of the wireless network, and decrypting the encrypted broadcast transmission to obtain broadcast information based on a cell-specific key derived from the broadcast root key.

An apparatus for wireless communications by a UE is described. The apparatus may include a processor, memory coupled with the processor, and instructions stored in the memory. The instructions may be executable by the processor to cause the apparatus to identify a broadcast root key for a wireless network, receive an encrypted broadcast transmission from a base station of the wireless network, and decrypt the encrypted broadcast transmission to obtain broadcast information based on a cell-specific key derived from the broadcast root key.

Another apparatus for wireless communications by a UE is described. The apparatus may include means for identifying a broadcast root key for a wireless network, receiving an encrypted broadcast transmission from a base station of the wireless network, and decrypting the encrypted broadcast transmission to obtain broadcast information based on a cell-specific key derived from the broadcast root key.

A non-transitory computer-readable medium storing code for wireless communications by a UE is described. The code may include instructions executable by a processor to identify a broadcast root key for a wireless network, receive an encrypted broadcast transmission from a base station of the wireless network, and decrypt the encrypted broadcast transmission to obtain broadcast information based on a cell-specific key derived from the broadcast root key.

In some examples of the method, apparatuses, and non-transitory computer-readable medium described herein, identifying the broadcast root key may include operations, features, means, or instructions for receiving control signaling that indicates the broadcast root key.

In some examples of the method, apparatuses, and non-transitory computer-readable medium described herein, identifying the broadcast root key may include operations, features, means, or instructions for receiving control signaling that indicates the broadcast root key via a secure connection established subsequent to completion of a registration procedure with a network entity of the wireless network.

In some examples of the method, apparatuses, and non-transitory computer-readable medium described herein, identifying the broadcast root key may include operations, features, means, or instructions for receiving control signaling that indicates a key identifier of the broadcast root key.

In some examples of the method, apparatuses, and non-transitory computer-readable medium described herein, identifying the broadcast root key may include operations, features, means, or instructions for receiving control signaling that indicates an expiration time for the broadcast root key.

Some examples of the method, apparatuses, and non-transitory computer-readable medium described herein may further include operations, features, means, or instructions for receiving second control signaling that indicates a second broadcast root key prior to expiration of the expiration time.

Some examples of the method, apparatuses, and non-transitory computer-readable medium described herein may further include operations, features, means, or instructions for receiving a second encrypted broadcast transmission from the base station or a second base station of the wireless network, and decrypting the second encrypted broadcast transmission to obtain second broadcast information based on a second cell-specific key derived from the second broadcast root key.

In some examples of the method, apparatuses, and non-transitory computer-readable medium described herein, identifying the broadcast root key may include operations, features, means, or instructions for receiving a registration accept message that indicates the broadcast root key.

Some examples of the method, apparatuses, and non-transitory computer-readable medium described herein may further include operations, features, means, or instructions for receiving an indication of a second key based on access stratum security setup with the base station, identifying a parameter associated with the second key, receiving encrypted downlink control information, and decrypting the encrypted downlink control information to obtain downlink control information based on a unicast key derived from the second key and the parameter.

In some examples of the method, apparatuses, and non-transitory computer-readable medium described herein, identifying the broadcast root key may include operations, features, means, or instructions for deriving the broadcast root key based on time information and a provisioned key.

In some examples of the method, apparatuses, and non-transitory computer-readable medium described herein, the time information may be a current time, a key refresh interval, or both.

In some examples of the method, apparatuses, and non-transitory computer-readable medium described herein, decrypting the encrypted broadcast transmission may include operations, features, means, or instructions for decrypting the encrypted broadcast transmission to obtain the broadcast information based on the cell-specific key that may be derived from the broadcast root key and a cell global identity associated with the base station.

In some examples of the method, apparatuses, and non-transitory computer-readable medium described herein, decrypting the encrypted broadcast transmission may include operations, features, means, or instructions for decrypting the encrypted broadcast transmission to obtain the broadcast information based on the cell-specific key that may be derived from an intermediate key.

In some examples of the method, apparatuses, and non-transitory computer-readable medium described herein, the intermediate key may be derived based on the broadcast root key and an identifier of the base station.

In some examples of the method, apparatuses, and non-transitory computer-readable medium described herein, the cell-specific key may be further derived based on a cell identifier associated with the base station.

A method of wireless communications by a base station is described. The method may include transmitting, to a UE, control signaling that indicates a broadcast root key and transmitting an encrypted broadcast transmission that is encrypted based on a cell-specific key derived from the broadcast root key.

An apparatus for wireless communications by a base station is described. The apparatus may include a processor, memory coupled with the processor, and instructions stored in the memory. The instructions may be executable by the processor to cause the apparatus to transmit, to a UE, control signaling that indicates a broadcast root key and transmit an encrypted broadcast transmission that is encrypted based on a cell-specific key derived from the broadcast root key.

Another apparatus for wireless communications by a base station is described. The apparatus may include means for transmitting, to a UE, control signaling that indicates a broadcast root key and transmitting an encrypted broadcast transmission that is encrypted based on a cell-specific key derived from the broadcast root key.

A non-transitory computer-readable medium storing code for wireless communications by a base station is described. The code may include instructions executable by a processor to transmit, to a UE, control signaling that indicates a broadcast root key and transmit an encrypted broadcast transmission that is encrypted based on a cell-specific key derived from the broadcast root key.

In some examples of the method, apparatuses, and non-transitory computer-readable medium described herein, transmitting the control signaling may include operations, features, means, or instructions for transmitting the control signaling that indicates the broadcast root key via a secure connection established subsequent to completion of a registration procedure between the UE and a network entity.

In some examples of the method, apparatuses, and non-transitory computer-readable medium described herein, transmitting the control signaling may include operations, features, means, or instructions for transmitting the control signaling that indicates a key identifier of the broadcast root key.

In some examples of the method, apparatuses, and non-transitory computer-readable medium described herein, transmitting the control signaling may include operations, features, means, or instructions for transmitting the control signaling that indicates an expiration time for the broadcast root key.

Some examples of the method, apparatuses, and non-transitory computer-readable medium described herein may further include operations, features, means, or instructions for transmitting second control signaling that indicates a second broadcast root key prior to expiration of the expiration time.

Some examples of the method, apparatuses, and non-transitory computer-readable medium described herein may further include operations, features, means, or instructions for transmitting a second encrypted broadcast transmission that may be encrypted based on a second cell-specific key derived from the second broadcast root key.

In some examples of the method, apparatuses, and non-transitory computer-readable medium described herein, transmitting the control signaling may include operations, features, means, or instructions for transmitting the control signaling that may be a registration accept message that indicates the broadcast root key.

Some examples of the method, apparatuses, and non-transitory computer-readable medium described herein may further include operations, features, means, or instructions for transmitting an indication of a second key based on access stratum security setup between the UE and the base station, and transmitting encrypted downlink control information that may be encrypted based on a unicast key derived from the second key and a parameter.

In some examples of the method, apparatuses, and non-transitory computer-readable medium described herein, transmitting the control signaling may include operations, features, means, or instructions for transmitting the control signaling that indicates the broadcast root key based on time information and a provisioned key.

In some examples of the method, apparatuses, and non-transitory computer-readable medium described herein, the time information may be a current time, a key refresh interval, or both.

Some examples of the method, apparatuses, and non-transitory computer-readable medium described herein may further include operations, features, means, or instructions for encrypting broadcast information to generate the encrypted broadcast transmission based on the cell-specific key that may be derived from the broadcast root key and a cell global identity associated with the base station.

Some examples of the method, apparatuses, and non-transitory computer-readable medium described herein may further include operations, features, means, or instructions for encrypting broadcast information to generate the encrypted broadcast transmission based on the cell-specific key that may be derived from an intermediate key.

In some examples of the method, apparatuses, and non-transitory computer-readable medium described herein, the intermediate key may be derived based on the broadcast root key and an identifier of the base station.

In some examples of the method, apparatuses, and non-transitory computer-readable medium described herein, the cell-specific key may be further derived based on a cell identifier associated with the base station.

DETAILED DESCRIPTION

Figure 1:
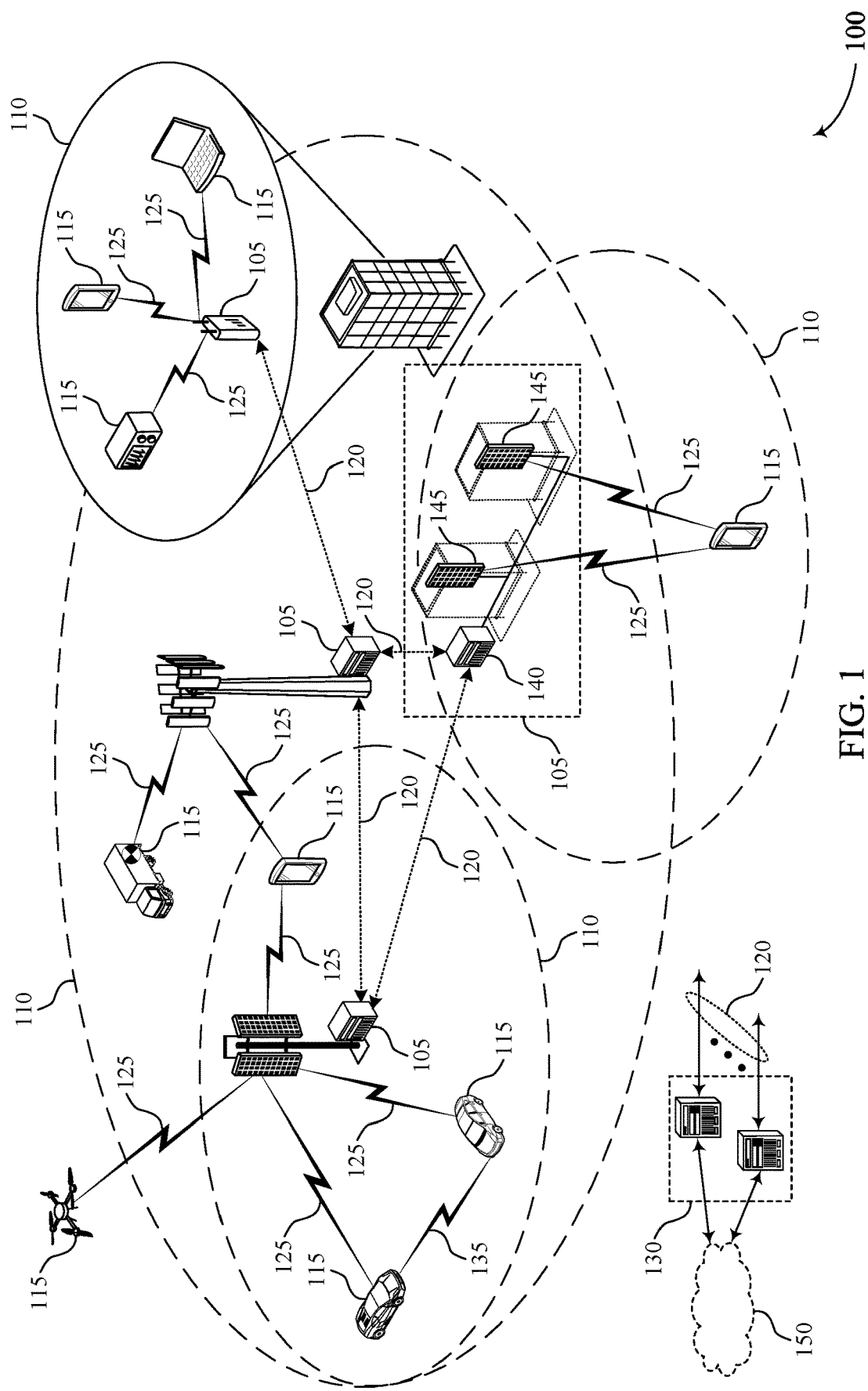
FIG. 1 illustrates an example of a wireless communications system that supports key provisioning for broadcast control channel protection in a wireless network in accordance with aspects of the present disclosure.

A user equipment (UE) may be connected to a network in a wireless communications system. The UE may receive broadcast communications and unicast communications. Broadcast communications between the UE and the network may not be secured and therefore may be vulnerable to arracks. For example, jamming or manipulating the physical downlink control channel (PDCCH) and associated communications from a base station to one or more UEs may cause denial of service or service downgrading at the UEs. The network may utilize a key protection scheme, in which the UEs and the network (i.e., the serving base station) may share one or more keys.

For example, unicast keys may be used to protect the downlink control information (DCI) from attacks for a specific UE, and broadcast keys may be used to protect DCI for more than one UE camped on the network. A key may be provisioned between a UE and a network that may be used for broadcast channel protection. In some cases, the UE may be provisioned with the encryption key during manufacturing (e.g., in a secure storage of the UE), such as via a universal integrated circuit card (UICC), or via another out-of-band (OOB) method. In other cases, the UE may establish a secure connection with the network, and the network may signal the root key to the UE via the secure connection. The UE may derive a cell-specific key from the root key based on a number of parameters. The parameters may include a current time, a base station identifier (ID), a cell ID, or another parameter. Further, the base station may also encrypt a broadcast channel transmission using the cell-specific key for transmission. The UE may receive and decrypt the encrypted broadcast channel transmission using a cell-specific key that may be derived from the provisioned root key.

In a first case, the UE may be provisioned with a broadcast protection root key for a network. The UE may then derive a cell-specific key from the broadcast protection root key. In another case, the UE may obtain the broadcast root key during registration with the network (e.g., during initial registration). The UE may also obtain the broadcast root key during a subsequent registration after the network has refreshed the key (e.g., during the periodic registration update or mobility registration update, which may use a registration procedure). The broadcast root key may be access and mobility management function (AMF) specific. The UE and the radio access network (RAN) node may then derive the cell-specific key. In either case, the UE may derive the cell-specific broadcast key from the root key and based on one or more cell-specific parameters (e.g., time, base station ID, cell ID, or another parameter), and may begin processing the protected broadcast messages from the base station.

Aspects of the disclosure are initially described in the context of wireless communications systems. Aspects of the disclosure are then described with respect to a key derivation process and a process flow. Aspects of the disclosure are further illustrated by and described with reference to apparatus diagrams, system diagrams, and flowcharts that relate to key provisioning for broadcast control channel protection in a wireless network.

FIG. 1 illustrates an example of a wireless communications system 100 that supports key provisioning for broadcast control channel protection in a wireless network in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may communicate with a base station 105 in wireless communications system 100. The base station 105 may communicate with one or more UEs 115 using broadcast messaging in a broadcast channel, such as in communication links 125. The base station 105 may transmit control signaling to the UE 115 over the broadcast channel that indicates a broadcast root key. The UE 115 may identify the broadcast root key for a wireless network corresponding to the base station 105. The base station 105 may transmit an encrypted broadcast transmission to the UE 115 over the broadcast channel. The UE 115 may receive the encrypted broadcast transmission from the base station 105, and the UE 115 may decrypt the encrypted broadcast transmission to obtain broadcast information based on a cell-specific key derived from the broadcast root key.

Figure 2:
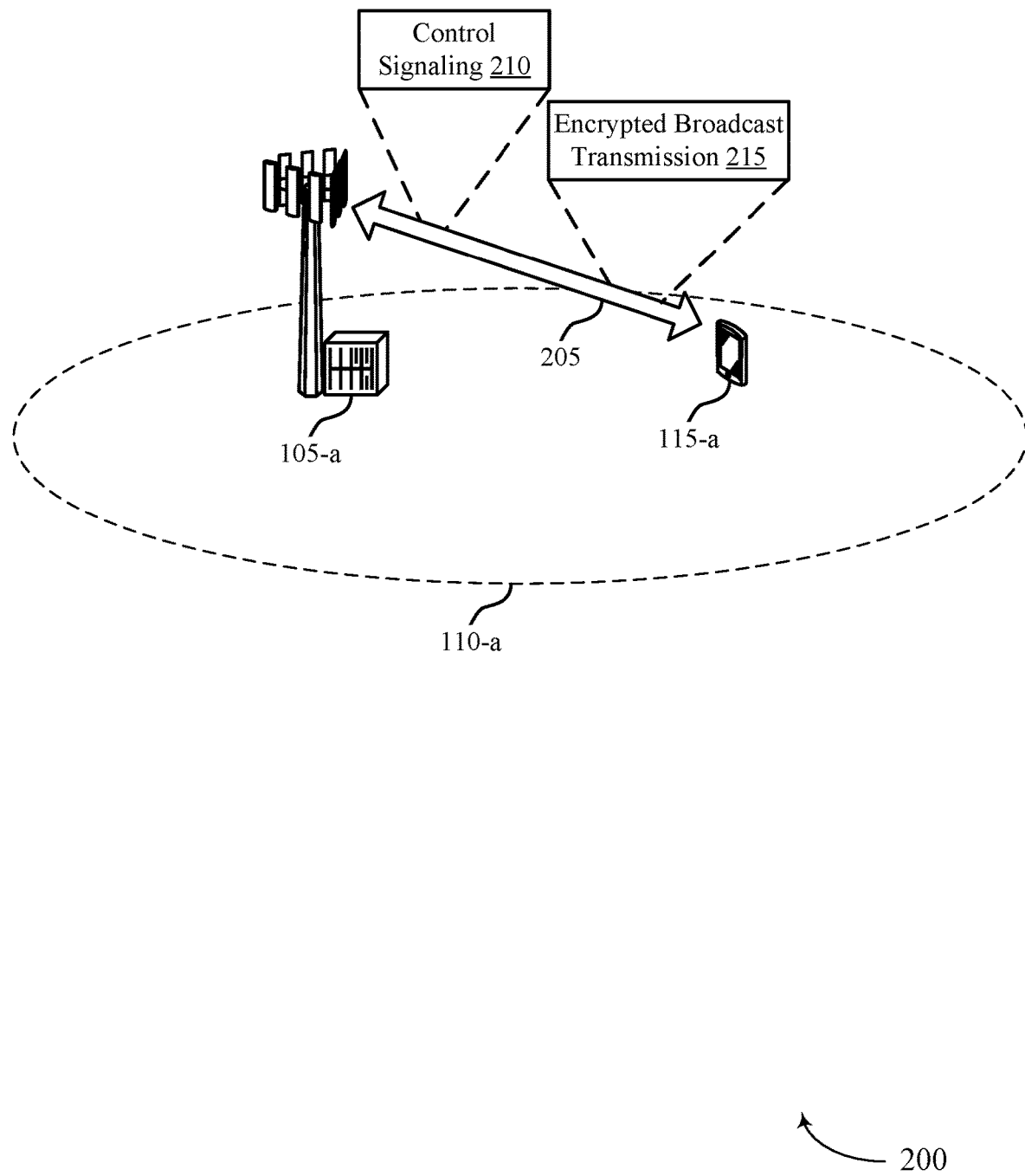
FIG. 2 illustrates an example of a wireless communications system that supports key provisioning for broadcast control channel protection in a wireless network in accordance with aspects of the present disclosure.

FIG. 2 illustrates an example of a wireless communications system 200 that supports key provisioning for broadcast control channel protection in a wireless network in accordance with aspects of the present disclosure. In some examples, wireless communications system 200 may implement aspects of wireless communication system 100. UE 115-a may be an example of a UE 115 as described with reference to FIG. 1. Base station 105-a may be an example of a base station 105 as described with reference to FIG. 1. UE 115-a may be served by base station 105-a within coverage area 110-a. Base station 105-a may communicate with UE 115-a by transmitting broadcast messages over broadcast channel 205. Broadcast channel 205 may be an example of a PDCCH. Among other types of control information, the PDCCH may be used to schedule radio resources for one or more UEs 115. Base station 105-a may transmit broadcast messages to one or more other UEs 115 over the same resources as broadcast messages to UE 115-a. Base station 105-a and UE 115-a may also communicate using unicast messaging.

Base station 105-a and UE 115-a may communicate as part of a public or a private network. In some cases, particularly private network cases, key provisioning to encrypt broadcast messages may avoid denial of service or service downgrading due to external manipulation of un-encrypted messaging. As such, UE 115-a may determine a cell-specific key for decoding encrypted broadcast transmissions 215 transmitted by base station 105-a in broadcast channel 205. UE 115-a may also identify a device public key.

In some cases, UE 115-*a* may be provisioned with a broadcast protection root key (e.g., $K_{B\text{-}Root}$) for the network including base station 105-*a*. The broadcast protection root key may be network specific. The root key may be provisioned at UE 115-*a* with an out-of-band (OOB) method along with a key identifier (ID) and optionally an expiration time for the root key. Some OOB methods may include UE 115-*a* being provisioned with the root key during manufacturing (e.g., in a secure storage of UE 115-*a*), in a UICC (e.g., a removable UICC, an embedded UICC, an integrated UICC, or another secure storage component of UE 115-*a*), or via another OOB method. In an example, UE 115-*a* may download an encrypted root key from a server, where the root key may be encrypted using the device public key, and the encrypted root key may be decrypted using a device private key associated with the device public key of UE 115-*a*. The device public key may be used for encryption, and the device private key may be used for decryption.

In some cases, the root key may be a derived from a long-term key K that may be provisioned or otherwise stored by the UE 115-*a*. In some cases, the root key may also be provisioned with an expiration timer. For example, a UE may be provisioned with parameters {Key ID, $K_{B\text{-}Root}$, [expiration time]}. The broadcast root key $K_{B\text{-}Root}$ may be derived from long-term K using a key derivation function (KDF) and optionally one or more parameters received from base station 105-*a* in control signaling 210, such as a parameter of the current time. UE 115-*a* may then derive the cell-specific key $K_{B\text{-}Cell}$ from the derived broadcast root key.

In some cases, UE 115-*a* may obtain a broadcast root key during a registration process with the network as a result of successful registration. The registration process may be the initial registration process or a subsequent registration process associated with a key refresh procedure. UE 115-*a* may establish a secure connection with the network via base station 105-*a*, and base station 105-*a* may signal information and parameters about the root key to UE 115-*a* by transmitting information about the root key in control signaling 210. In some examples, UE 115-*a* may derive $K_{B\text{-}Root}$ based on the long-term key K and optionally one or more other parameters.

In some examples, the root key $K_{B\text{-}Root}$ may be provisioned at UE 115-*a* using a secure NAS signaling (e.g., in a Registration Accept message), along with a key ID and an expiration time. UE 115-*a* may be provisioned with {Key ID, $K_{B\text{-}Root}$, expiration time}. The broadcast root key $K_{B\text{-}Root}$ may be refreshed in accordance with a key refresh interval as described herein. In some cases, a root key $K_{Root}$ may be provided to UE 115-*a* for UE 115-*a* to derive $K_{B\text{-}Root}$ based on $K_{Root}$. In some cases, the root key $K_{Root}$ may be a long term key K or may be equivalent to a long-term key K (e.g., may be provisioned to the UE 115-*a* in a secure OOB manner and securely stored by the UE 115-*a*). In some cases, the broadcast root key $K_{B\text{-}Root}$ may be derived using time information (e.g., a current time or a function of a current time) and the long-term key K. UE 115-*a* and base station 105-*b* (e.g., a RAN node) may derive a cell-specific key $K_{B\text{-}Cell}$ based on broadcast root key $K_{B\text{-}Root}$.

In some examples, the broadcast root key may be AMF specific (or AMF set, TA-specific depending on the network configuration). In some cases, the broadcast root key may be applicable to public networks. Base station 105-*a* may be provisioned with the cell-specific key from the AMF. In some cases, base station 105-*a* may be connected to multiple AMFs that use different broadcast root keys, as an AMF specific root key may not be effective. The cell-specific key may be tracking area (TA)-specific and may be shared among AMFs in the same TA. In some examples, the broadcast root key may be generated and distributed by an NF (e.g., a security anchor function (SEAF)) that may be above the AMF in the hierarchy.

During the mobility registration update or periodic registration update procedure, UE 115-*a* may obtain the latest broadcast root key from the AMF via base station 105-*a*. The key refresh and revocation process may be flexible. A particular RAN resource may be set aside for initial registration between UE 115-*a* and base station 105-*a*. Encryption or integrity protection of the broadcast messages may not apply in the case or initial registration.

Unicast communications, such as transmission of DCI to UE 115-*a*, may also undergo encryption and decryption. The DCI may be protected by the base station 105-*a* using a UE-specific key that may be derived from a base station key, such as a $K_{gNB}$ or $K_{eNB}$, which may be established during the AS security setup. In an example, the UE-specific unicast key may be derived by $K_{U\text{-}Cell}$=KDF($K_{gNB}$, param) or $K_{U\text{-}cell}$=KDF($K_{eNB}$, param) where param may be the cell ID of the serving base station 105-*a*, a DCI protection parameter with which the UE 115-*a* is preconfigured or configured by the network, or both. Protection for unicast communications may be applied in cases where the RRC connected UE 115-*a* is allocated an identifier, such as a cell radio network temporary identifier (C-RNTI), from the serving base station 105-*a*.

The base station 105-*a* may encrypt unicast transmissions using the unicast protection key, and the UE 115-*a* may UE 115-*a* may use the unicast protection key for decrypting or checking the integrity of the unicast transmissions, such as DCI for UE 115-*a*. In the initial access process, UE 115-*a* may start using the unicast protection key after sending the AS security mode complete message to base station 105-*a*. In the handover process, UE 115-*a* may begin using the unicast protection key after sending the handover complete message to base station 105-*a*. In the radio link failure (RLF) recovery process, UE 115-*a* may start using the unicast protection key after receiving the RRC reestablishment message from base station 105-*a*. In the RRC inactive process, UE 115-*a* may start using the unicast protection key after receiving the RRC Resume message from base station 105-*a*.

Base station 105-*a* may start using the unicast protection key for decrypting or checking the integrity of the DCI for UE 115-*a*. In the initial access process, base station 105-*a* may start using the unicast protection key after receiving the AS Security Mode complete message from UE 115-*a*. In the handover process, base station 105-*a* may start using the unicast protection key after receiving the RRC Reconfiguration complete message from UE 115-*a*. In the RLF recovery process, base station 105-*a* may start using the unicast protection key after sending the RRC reestablishment message to UE 115-*a*. In the RRC inactive process, the base station may start using the unicast protection key after sending the RRC Resume message to UE 115-*a*.

Once UE 115-*a* has determined the cell-specific key, UE 115-*a* may decrypt encrypted broadcast transmission 215 transmitted by base station 105-*a* in broadcast channel 205. The cell-specific key may be updated periodically cased on a refresh time that updates $K_{B\text{-}Root}$, and the derivation of $K_{B\text{-}Cell}$ may be performed again by UE 115-*a*.

Figure 3:
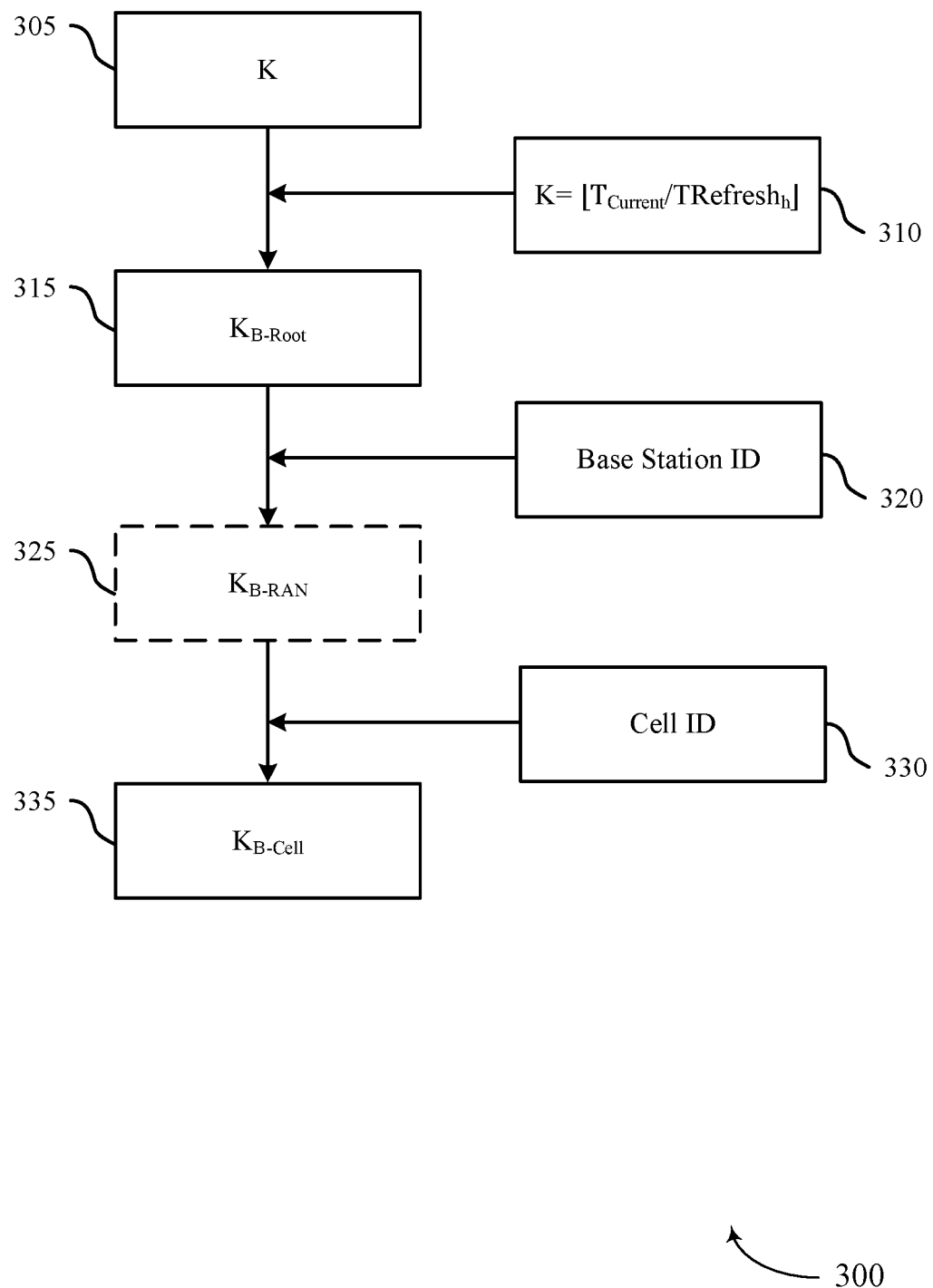
FIG. 3 illustrates an example of a key derivation process that supports key provisioning for broadcast control channel protection in a wireless network in accordance with aspects of the present disclosure.

FIG. 3 illustrates an example of a key derivation process 300 that supports key provisioning for broadcast control channel protection in a wireless network in accordance with aspects of the present disclosure. In some examples, key derivation process 300 may implement aspects of wireless communication systems 100 and 200. Key derivation process 300 may be used by a UE 115 or a base station 105 in order to determine a cell-specific encryption key $K_{B-Cell}$ based on an original public key K and other parameters.

A UE 115 may be provisioned with a long-term key K 305 using an OOB method, or based on a successful registration process with a base station. A UE 115 may receive control signaling from a base station that indicates a current time and other parameters, such as refresh information. Based on these parameters, at 310 the UE 115 may use the parameters to derive the broadcast root key $K_{B-Root}$ 315.

In some examples, the broadcast root key $K_{B-Root}$ 315 may be derived from a long term key K 305 provisioned at the UE and associated with time information, such as a current time parameter (e.g., $T_{current}$) at 310. $K_{B-Root}$ 315 may be derived by $K_{B-Root}$=KDF(K, param) where $$param = \left\lfloor \frac{T_{current}}{TRefresh_h} \right\rfloor$$

and where $TRefresh_h$ may the key refresh interval having a time duration that may be received in control signaling from the base station. The brackets surrounding $$\frac{T_{current}}{TRefresh_h}$$

in the above equation may indicate a flooring operation. In some examples, a ceiling operation may be used in the above equation for $$\frac{T_{current}}{TRefresh_h}$$

for determining $K_{B-Root}$. In some examples, param may be directly used as a Key ID or may be associated with a Key ID.

In some examples, the UE 115 may then obtain the base station ID (e.g., an eNB or a gNB ID) at 320. The UE 115 may obtain the base station ID during the registration process with the base station or based on control signaling from the base station. The base station ID of base station 105-a may be obtained from a system information block (SIB) transmitted (e.g., broadcast) by the base station 105-a. The CGI of the cell in the SIB message and the information for the UE 115-a to read the SIB may not be encrypted, so that UE 115-a can read the SIB to derive subsequent keys, such as a cell-specific key. In some cases, the UE 115 may use the base station ID to derive an intermediate key, such as a RAN-specific key $K_{B-RAN}$ 320. The intermediate key may be associated with a particular RAN that includes the base station 105. $K_{B-RAN}$ 320 may be derived by $K_{B-RAN}$=KDF($K_{B-Root}$, base station ID) where the base station ID (e.g., eNB or gNB ID) may be a base station specific part of the cell global identity (CGI).

In some examples, the UE 115 may then obtain the cell ID at 330, based on control signaling or the registration process with the cell, and the UE 115 may use the cell ID to derive cell-specific key $K_{B-Cell}$ 335. The cell-specific key may be derived from an intermediate key $K_{B-RAN}$ 320. $K_{B-Cell}$ 335 may be derived based on $K_{B-Cell}$=KDF($K_{RAN}$, Cell ID) where Cell ID may be the cell-specific part of the CGI.

In some cases, the UE 115 may not derive the intermediate key $K_{B-RAN}$ at 325, and instead may derive the cell-specific key $K_{B-Cell}$ from broadcast root key $K_{B-Root}$. In some cases, the UE 115 may derive the cell-specific key $K_{B-Cell}$ from the broadcast protection root key $K_{B-Root}$. $K_{B-Cell}$ may be defined as $K_{B-Cell}$=KDF($K_{B-Root}$, Cell ID) where Cell ID is a CGI, and CGI=base station ID+cell ID. A RAN node, such as base station 105, may be provisioned with $K_{B-Cell}$ for each cell that is unique to each cell by a network operator (e.g., via an AMF, a unified data management (UDM), or operations, administration, and maintenance (OAM)), and thus the intermediate RAN-specific key at 325 may not be used.

The UE 115 may use the $K_{B-Cell}$ decryption key 335 to decrypt broadcast messages transmitted by the base station 105.

Figure 4:
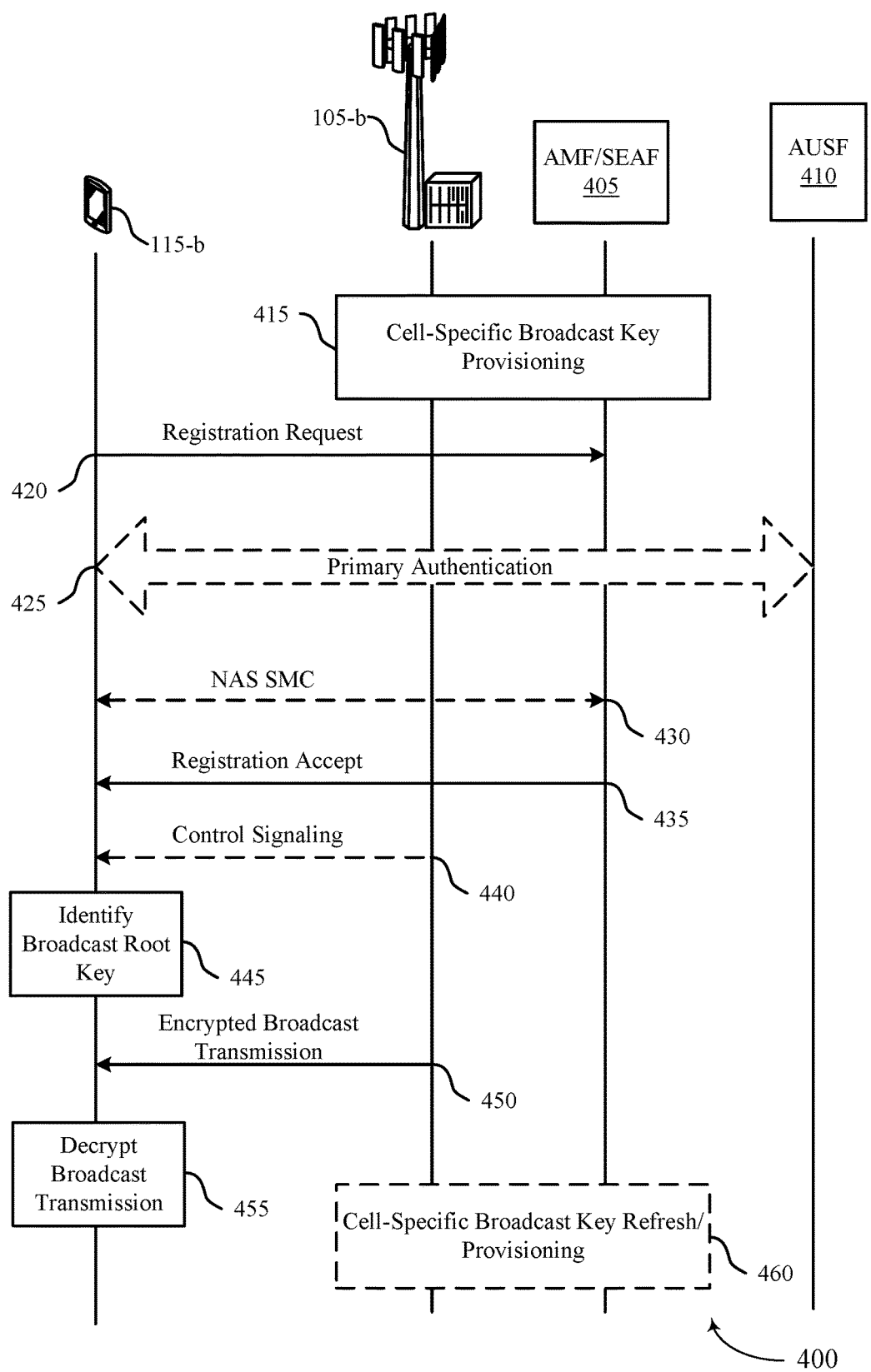
FIG. 4 illustrates an example of a process flow that supports key provisioning for broadcast control channel protection in a wireless network in accordance with aspects of the present disclosure.

FIG. 4 illustrates an example of a process flow 400 that supports key provisioning for broadcast control channel protection in a wireless network in accordance with aspects of the present disclosure. In some examples, process flow 400 may implement aspects of wireless communication systems 100 and 200. UE 115-b may be an example of a UE 115 as described with reference to FIGS. 1-3, and base station 105-b may be an example of a UE 115 as described with reference to FIGS. 1-3. AMF/SEAF 405 may be an example of an AMF as described with reference to FIG. 2. Authentication server function (AUSF) 410, AMF/SEAF 405, and base station 105-b may be components of the network as described herein.

The cell-specific broadcast root key may be provisioned at base station 105-b (e.g., a gNB). At 415, base station 105-b and AMF/SEAF 405 may perform cell-specific broadcast key provision. At this point, the base station 105-b may identify the cell-specific root kay that UE 115-b may later derive based on information proved to UE 115-b by base station 105-b.

The UE may obtain one or more broadcast root keys during the registration procedure with the AMF/SEAF 405. For example, at 420, UE 115-b may transmit a registration request to AMF/SEAF 405. At 425, UE 115-b and AUSF 410 may perform authentication (e.g., primary authentication), which may be a registration process in which UE 115-b may receive a root key. At 430, UE 115-b may perform NAS security mode command (SMC) with AMF/SEAF 405. At 435, UE 115-b may receive a registration accept message (e.g., a NAS registration accept message) from AMF/SEAF 405. In some cases, UE 115-b may receive the broadcast root key based on this initial registration completion, or based on a subsequent registration completion that may be based on a key refresh process. In some cases, the registration accept message may include a key identifier of a broadcast root key, a broadcast root key, an encrypted broadcast root key, an expiration time of the broadcast root key, or any combination thereof. For an encrypted broadcast root key, the UE 115-b may decrypt the encrypted broadcast root key using, for example, a public key associated with a private key used to encrypt the encrypted broadcast root key. In some cases, UE 115-b may be provisioned with broadcast root key during manufacturing or another OOB method. In some cases, the registration accept message may not include the broadcast root key, and the UE 115-a may identify or derive the broadcast root key from the key identifier and optionally in combination with other information (e.g., current time, etc.)

In some cases, at 440, base station 105-b may transmit, to UE 115-b, control signaling that indicates a broadcast root key. UE 115-b may receive the control signaling that indicated the broadcast root key. In some cases, UE 115-*b* may receive control signaling that indicates the broadcast root key via a secure connection established subsequent to completion of a registration procedure with a network entity (e.g., base station 105-*b*, the AMF/SEAF 405 or the AUSF 410) of the wireless network.

In some cases, UE 115-*b* may receive control signaling that indicates a key ID of the broadcast root key. UE 115-*b* may also receive control signaling that indicates an expiration time for the broadcast root key. In this case, UE 115-*b* may receive control signaling that indicates a second broadcast root key prior to expiration of the expiration time. This updated broadcast root key may be based on the cell-specific broadcast key refresh and provisioned that occurs between base station 105-*b* and AMF/SEAF 405 at 460.

At 445, UE 115-*b* may identify the broadcast root key for the wireless network. UE 115-*b* may identify the broadcast root key based on signaling received from base station 105-*b*, AMF/SEAF 405, or AUSF 410, or may identify the broadcast root key based on OOB provisioning. For example, UE 115-*b* may identify that broadcast root key based on receiving the registration accept message at 435 from AMF/SEAF 405 that indicates the broadcast root key.

UE 115-*b* may derive the broadcast root key based on time information and a provisioned key, such as a long term key K. The time information may be a current time, a key refresh interval, or both.

Base station 105-*b* may encrypt the broadcast information to generate the encrypted broadcast transmission using the cell-specific key that may be derived from the broadcast root key and a cell global identity associated with base station 105-*b*. Base station 105-*b* may also encrypt broadcast information to generate the encrypted broadcast transmission using the cell-specific key that may be derived from the broadcast root key and a CGI associated with base station 105-*b*.

At 450, UE 115-*b* may receive an encrypted broadcast transmission from base station 105-*b* of the wireless network. In some cases, UE 115-*b* may receive a second encrypted broadcast transmission from base station 105-*b* or from a second base station 105 of the wireless network. In this case, at 455 UE 115-*b* may decrypt the second encrypted broadcast transmission to obtain second broadcast information based on a second cell-specific key derived from the second broadcast root key.

At 455, UE 115-*b* may decrypt the encrypted broadcast transmission to obtain broadcast information based on a cell-specific key derived from the broadcast root key.

UE 115-*b* may decrypt the encrypted broadcast transmission to obtain the broadcast information based on the cell-specific key that may be derived from the broadcast root key and a CGI associated with base station 105-*b*. UE 115-*b* may decrypt the encrypted broadcast transmission to obtain the broadcast information based on the cell-specific key that may be derived from an intermediate key (e.g., $K_{B-RAN}$). The intermediate key may be derived based on the broadcast root key and the ID of base station 105-*b*. The base station ID of base station 105-*b* may be obtained from a SIB. The CGI of the cell in a SIB message and the information for the UE 115-*b* to read the SIB may not be encrypted, so that UE 115-*b* can read the SIB to derive the cell-specific key. The cell-specific key may be further derived based on a cell ID associated with base station 105-*b*.

UE 115-*b* may receive an indication of a second key based on access stratum security setup with base station 105-*b*. UE 115-*b* may identify a parameter associated with the second key. UE 115-*b* may receive encrypted DCI, and UE 115-*b* may decrypt the encrypted DCI to obtain DCI based on a unicast key derived from the second key and the parameter.

Figure 5:
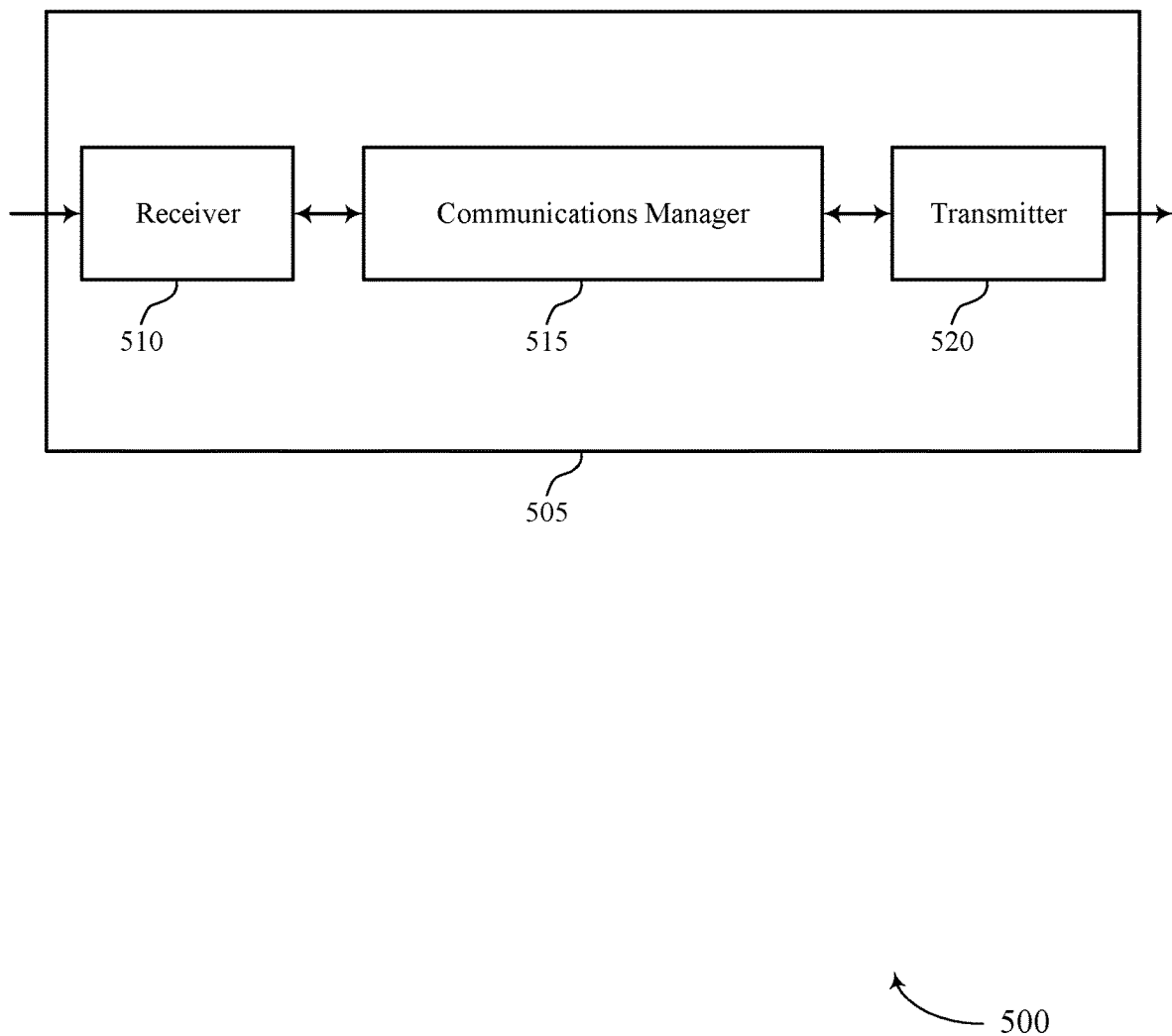
FIGS. 5 and 6 show block diagrams of devices that support key provisioning for broadcast control channel protection in a wireless network in accordance with aspects of the present disclosure.

FIG. 5 shows a block diagram 500 of a device 505 that supports key provisioning for broadcast control channel protection in a wireless network in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to key provisioning for broadcast control channel protection in a wireless network, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a broadcast root key for a wireless network, receive an encrypted broadcast transmission from a base station of the wireless network, and decrypt the encrypted broadcast transmission to obtain broadcast information based on a cell-specific key derived from the broadcast root key. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, UE communications manager 515 described herein may be implemented as a chipset of a wireless modem, and the receiver 510 and the transmitter 520 may be implemented as sets of analog components (e.g., amplifiers, filters, phase shifters, antennas, etc.) The wireless modem may obtain and decode signals from the receiver 510 over a receive interface, and may output signals for transmission to the transmitter 520 over a transmit interface.

The actions performed by the communications manager 515 as described herein may be implemented to realize one or more potential advantages. The communications manager 515 may operate receiver 510 to receive encrypted broadcast messaging from a base station 105. The reception of the encrypted broadcast messaging may allow a UE 115 to improve communications reliability and efficiency by avoiding service downgrading and service denial at the UE 115. This may in turn allow the UE 115 to save power and increase battery life.

Figure 6:
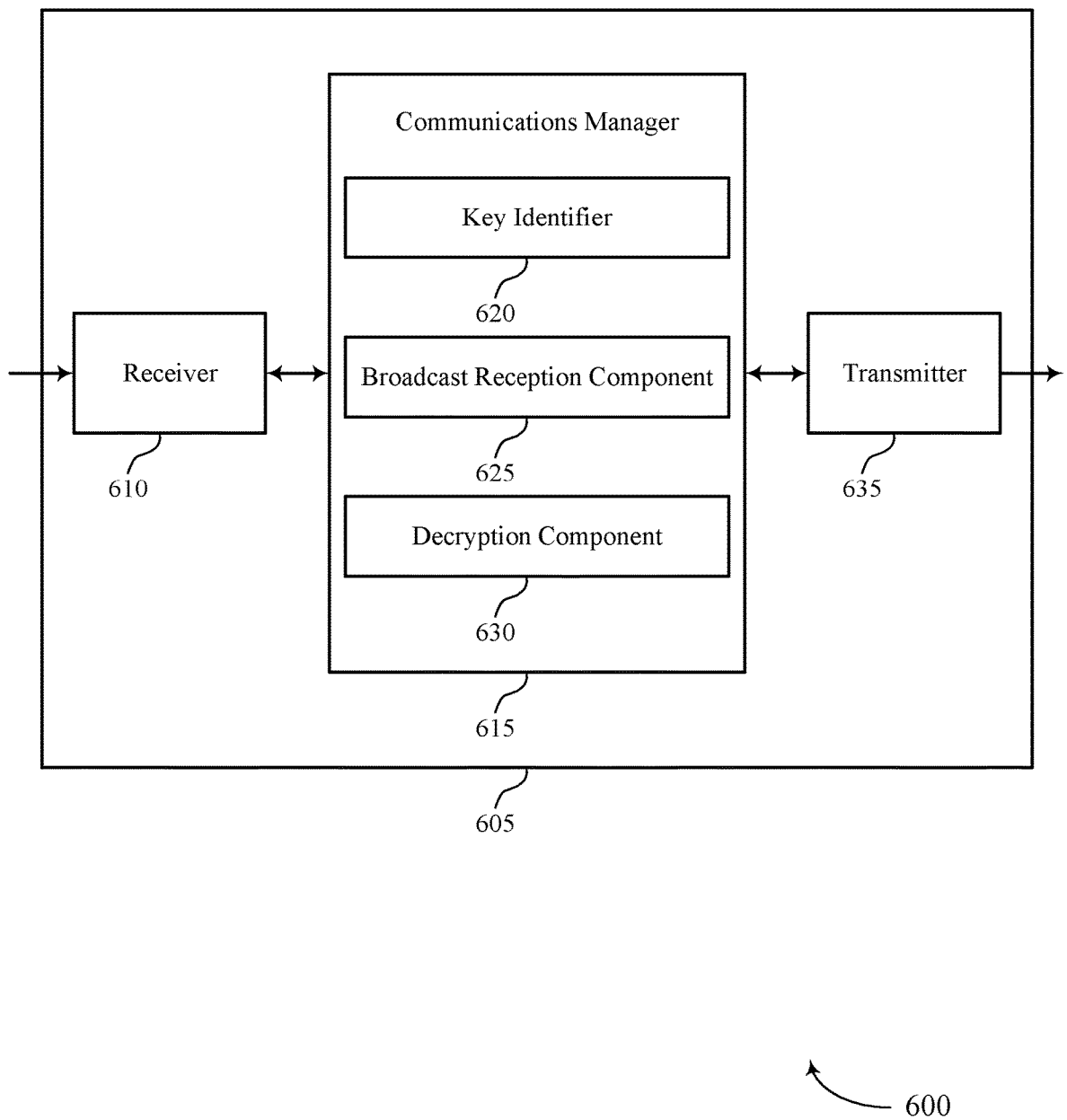

FIG. 6 shows a block diagram 600 of a device 605 that supports key provisioning for broadcast control channel protection in a wireless network in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to key provisioning for broadcast control channel protection in a wireless network, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a key identifier 620, a broadcast reception component 625, and a decryption component 630. The communications manager 615 may be an example of aspects of the communications manager 810 described herein.

The key identifier 620 may identify a broadcast root key for a wireless network. The broadcast reception component 625 may receive an encrypted broadcast transmission from a base station of the wireless network. The decryption component 630 may decrypt the encrypted broadcast transmission to obtain broadcast information based on a cell-specific key derived from the broadcast root key.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

A processor of a UE 115 (e.g., controlling the receiver 610, the transmitter 635, or the transceiver 820 as described with reference to FIG. 8) may efficiently operate the components described herein to improve communications reliability at a UE 115. The processor may operate the components to use the receiver 610 to receive encrypted broadcast messages from a base station 105, and the processor may operate key identifier 620 and decryption component 630 to decrypt the messages. This decryption may avoid communications interruptions at the UE 115 due to sabotage or jamming and may therefore improve efficiency and increase battery life of the UE 115.

Figure 7:
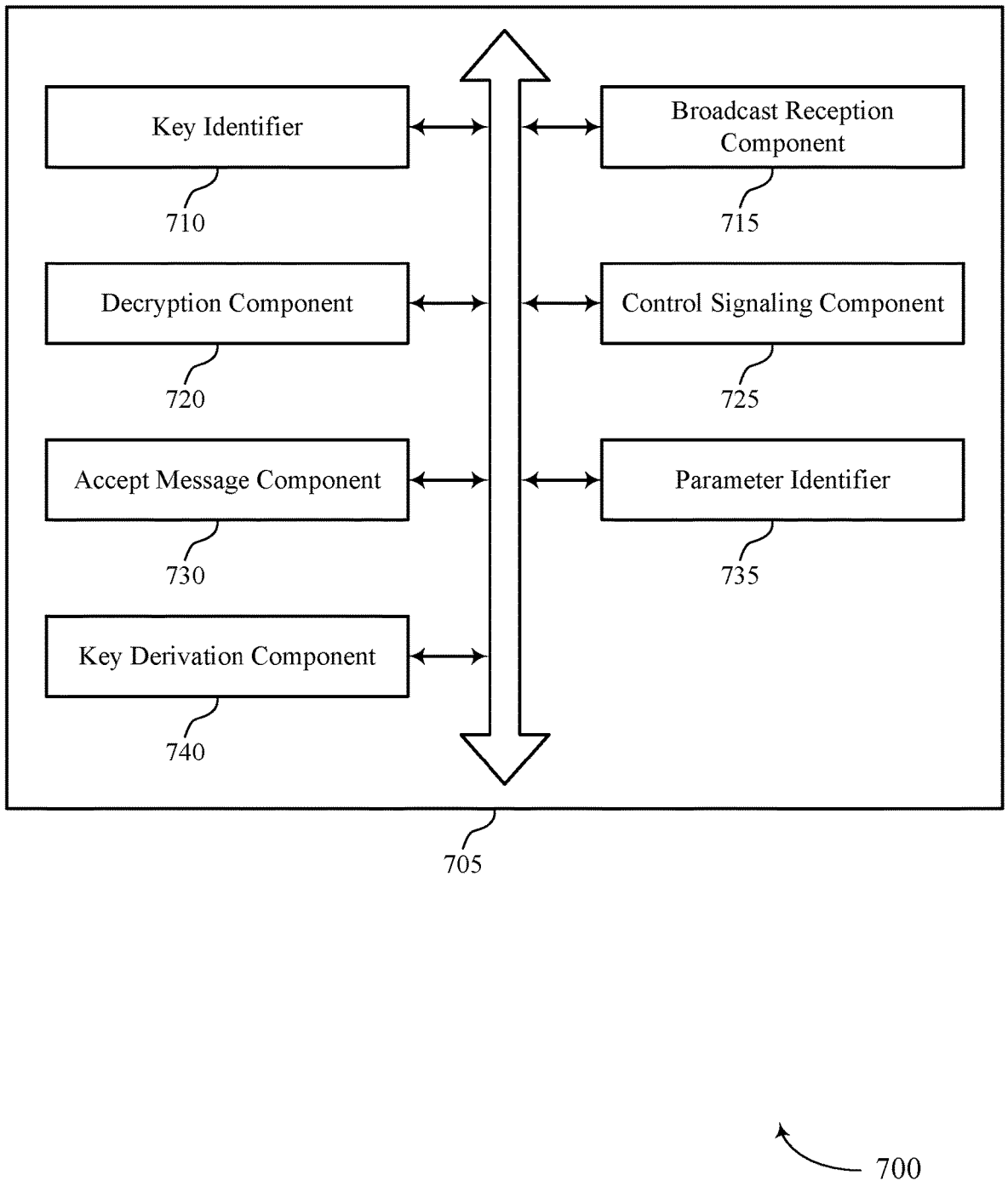
FIG. 7 shows a block diagram of a communications manager that supports key provisioning for broadcast control channel protection in a wireless network in accordance with aspects of the present disclosure.

FIG. 7 shows a block diagram 700 of a communications manager 705 that supports key provisioning for broadcast control channel protection in a wireless network in accordance with aspects of the present disclosure. The communications manager 705 may be an example of aspects of a communications manager 515, a communications manager 615, or a communications manager 810 described herein. The communications manager 705 may include a key identifier 710, a broadcast reception component 715, a decryption component 720, a control signaling component 725, an accept message component 730, a parameter identifier 735, and a key derivation component 740. Each of these modules may communicate, directly or indirectly, with one another (e.g., via one or more buses).

The key identifier 710 may identify a broadcast root key for a wireless network.

In some examples, the key identifier 710 may receive an indication of a second key based on access stratum security setup with the base station.

The broadcast reception component 715 may receive an encrypted broadcast transmission from a base station of the wireless network.

In some examples, the broadcast reception component 715 may receive a second encrypted broadcast transmission from the base station or a second base station of the wireless network.

The decryption component 720 may decrypt the encrypted broadcast transmission to obtain broadcast information based on a cell-specific key derived from the broadcast root key. In some examples, the decryption component 720 may decrypt the second encrypted broadcast transmission to obtain second broadcast information based on a second cell-specific key derived from the second broadcast root key. In some examples, the decryption component 720 may decrypt the encrypted DCI to obtain DCI based on a unicast key derived from the second key and the parameter. In some examples, the decryption component 720 may decrypt the encrypted broadcast transmission to obtain the broadcast information based on the cell-specific key that is derived from the broadcast root key and a cell global identity associated with the base station.

In some examples, the decryption component 720 may decrypt the encrypted broadcast transmission to obtain the broadcast information based on the cell-specific key that is derived from an intermediate key.

The control signaling component 725 may receive control signaling that indicates the broadcast root key. In some examples, the control signaling component 725 may receive control signaling that indicates the broadcast root key via a secure connection established subsequent to completion of a registration procedure with a network entity of the wireless network. In some examples, the control signaling component 725 may receive control signaling that indicates a key identifier of the broadcast root key. In some examples, the control signaling component 725 may receive control signaling that indicates an expiration time for the broadcast root key. In some examples, the control signaling component 725 may receive second control signaling that indicates a second broadcast root key prior to expiration of the expiration time. In some examples, the control signaling component 725 may receive encrypted DCI.

The accept message component 730 may receive a registration accept message that indicates the broadcast root key. The parameter identifier 735 may identify a parameter associated with the second key. The key derivation component 740 may derive the broadcast root key based on time information and a provisioned key. In some cases, the time information is a current time, a key refresh interval, or both. In some cases, the intermediate key is derived based on the broadcast root key and an identifier of the base station. In some cases, the cell-specific key is further derived based on a cell identifier associated with the base station.

Figure 8:
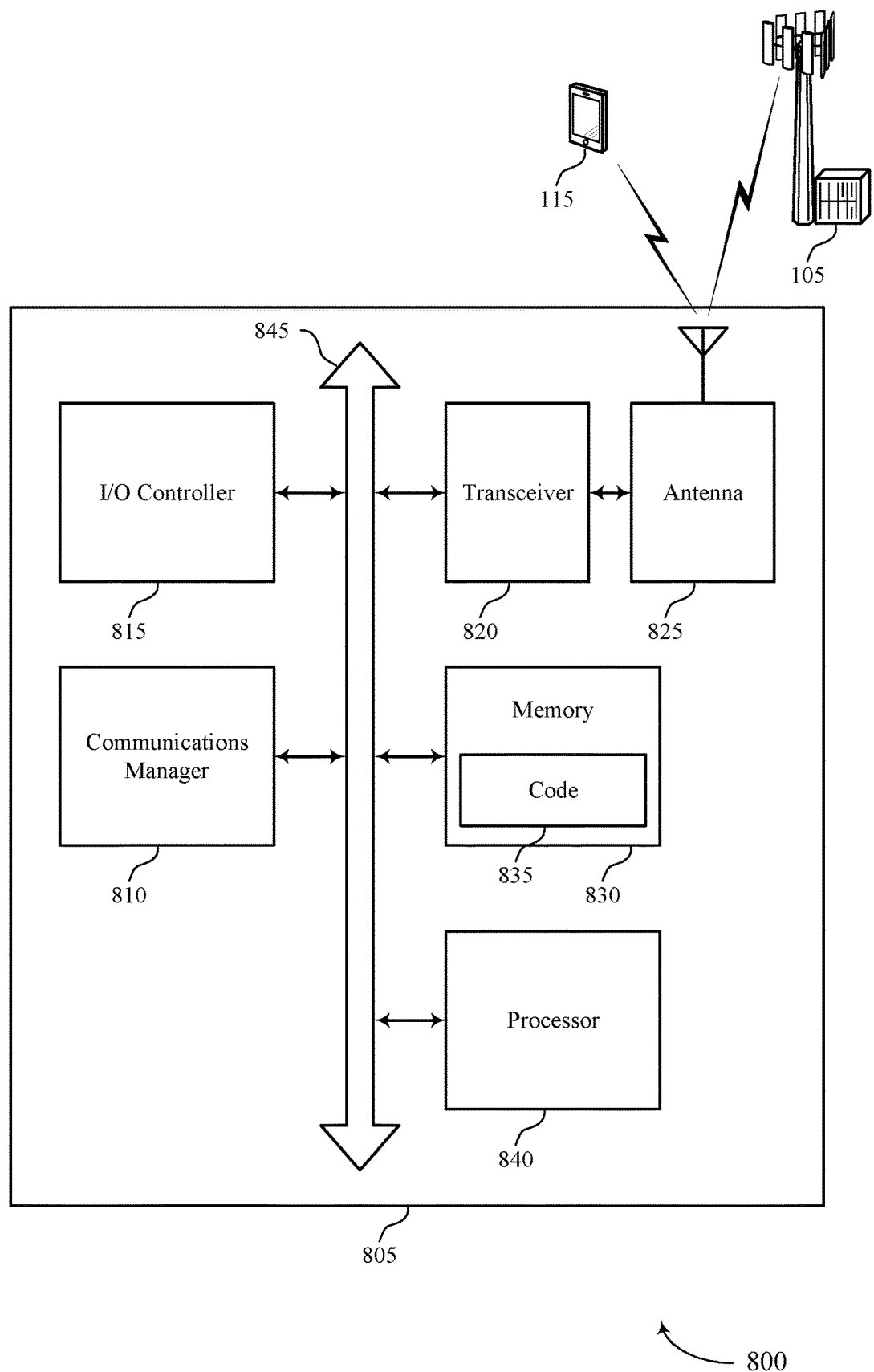
FIG. 8 shows a diagram of a system including a device that supports key provisioning for broadcast control channel protection in a wireless network in accordance with aspects of the present disclosure.

FIG. 8 shows a diagram of a system 800 including a device 805 that supports key provisioning for broadcast control channel protection in a wireless network in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a broadcast root key for a wireless network, receive an encrypted broadcast transmission from a base station of the wireless network, and decrypt the encrypted broadcast transmission to obtain broadcast information based on a cell-specific key derived from the broadcast root key.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting key provisioning for broadcast control channel protection in a wireless network).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
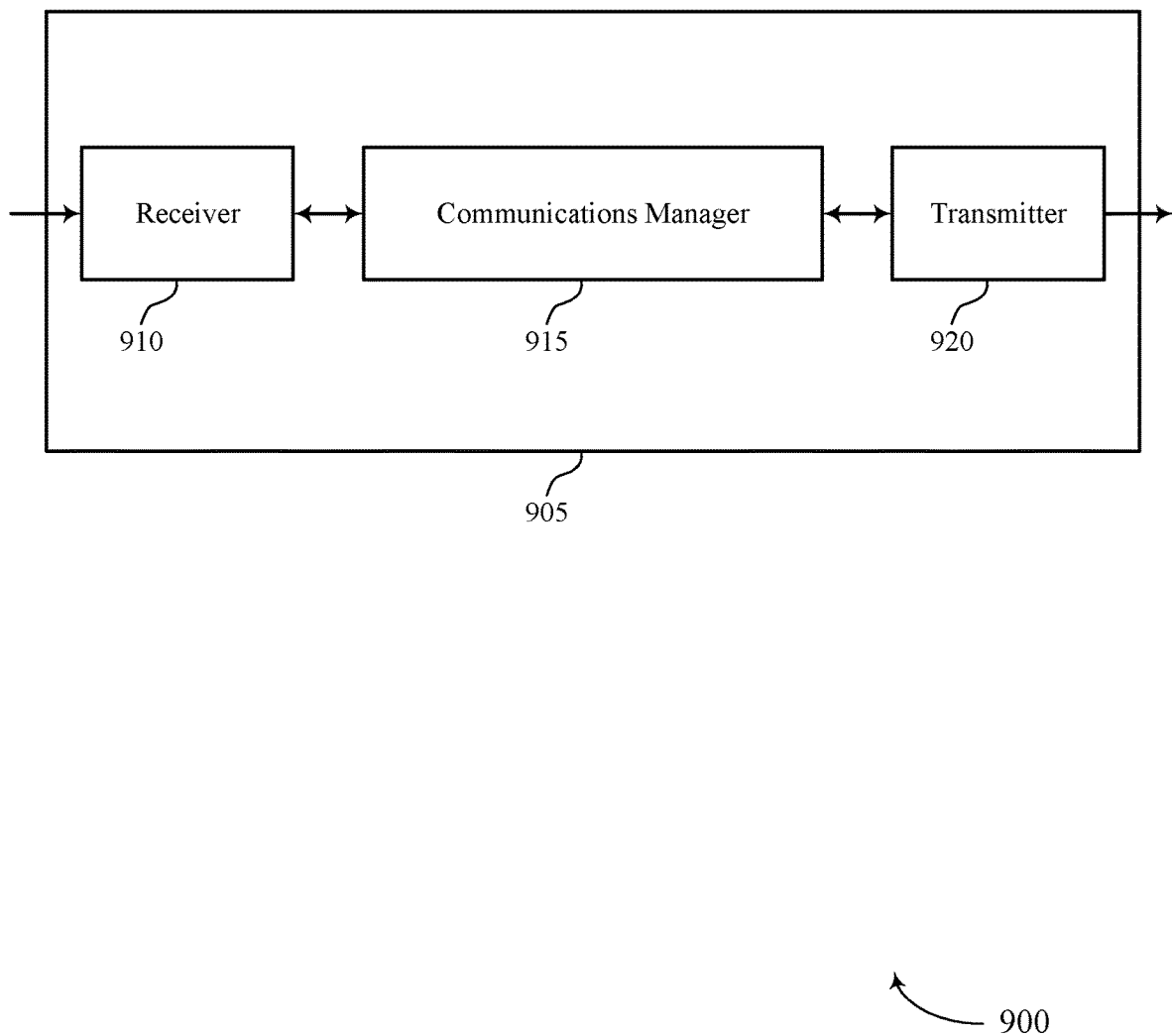
FIGS. 9 and 10 show block diagrams of devices that support key provisioning for broadcast control channel protection in a wireless network in accordance with aspects of the present disclosure.

FIG. 9 shows a block diagram 900 of a device 905 that supports key provisioning for broadcast control channel protection in a wireless network in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to key provisioning for broadcast control channel protection in a wireless network, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, control signaling that indicates a broadcast root key and transmit an encrypted broadcast transmission that is encrypted based on a cell-specific key derived from the broadcast root key. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
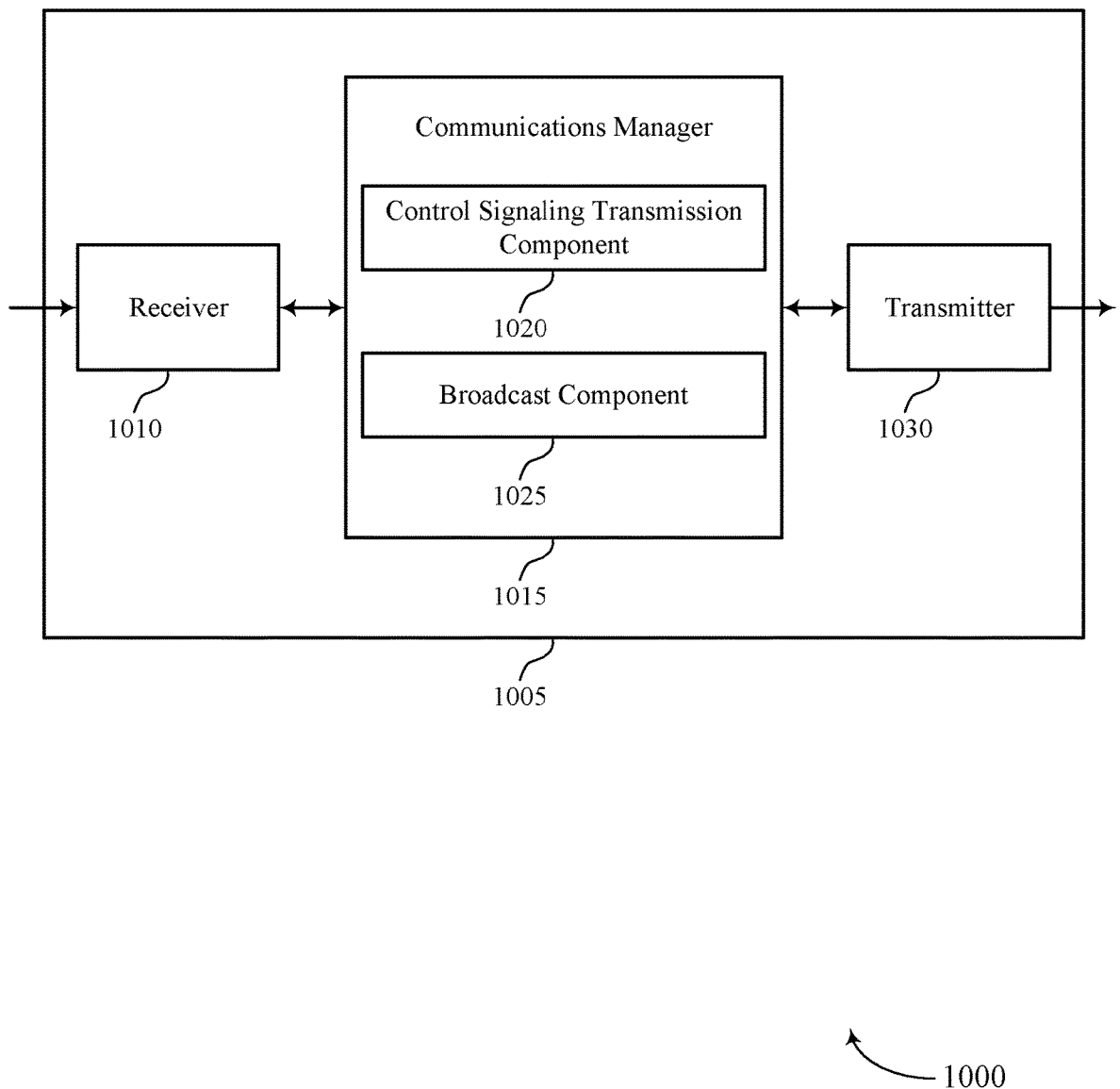

FIG. 10 shows a block diagram 1000 of a device 1005 that supports key provisioning for broadcast control channel protection in a wireless network in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to key provisioning for broadcast control channel protection in a wireless network, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control signaling transmission component 1020 and a broadcast component 1025. The communications manager 1015 may be an example of aspects of the communications manager 1210 described herein. The control signaling transmission component 1020 may transmit, to a UE, control signaling that indicates a broadcast root key. The broadcast component 1025 may transmit an encrypted broadcast transmission that is encrypted based on a cell-specific key derived from the broadcast root key.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
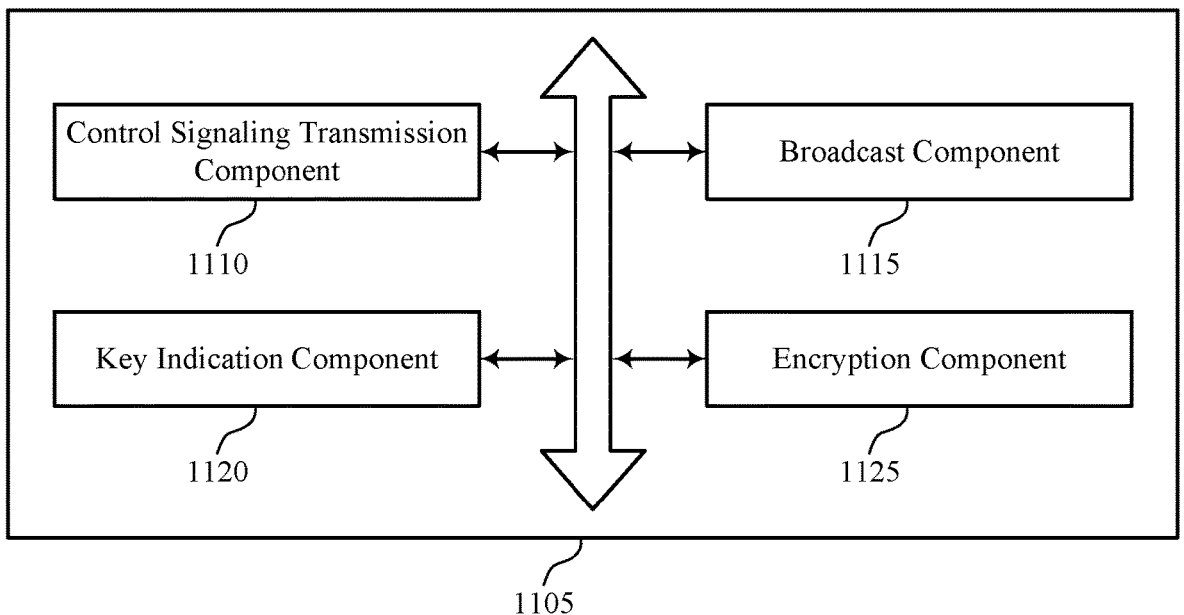
FIG. 11 shows a block diagram of a communications manager that supports key provisioning for broadcast control channel protection in a wireless network in accordance with aspects of the present disclosure.

FIG. 11 shows a block diagram 1100 of a communications manager 1105 that supports key provisioning for broadcast control channel protection in a wireless network in accordance with aspects of the present disclosure. The communications manager 1105 may be an example of aspects of a communications manager 915, a communications manager 1015, or a communications manager 1210 described herein. The communications manager 1105 may include a control signaling transmission component 1110, a broadcast component 1115, a key indication component 1120, and an encryption component 1125. Each of these modules may communicate, directly or indirectly, with one another (e.g., via one or more buses).

The control signaling transmission component 1110 may transmit, to a UE, control signaling that indicates a broadcast root key. In some examples, the control signaling transmission component 1110 may transmit the control signaling that indicates the broadcast root key via a secure connection established subsequent to completion of a registration procedure between the UE and a network entity. In some examples, the control signaling transmission component 1110 may transmit the control signaling that indicates a key identifier of the broadcast root key. In some examples, the control signaling transmission component 1110 may transmit the control signaling that indicates an expiration time for the broadcast root key. In some examples, the control signaling transmission component 1110 may transmit second control signaling that indicates a second broadcast root key prior to expiration of the expiration time.

In some examples, the control signaling transmission component 1110 may transmit the control signaling that is a registration accept message that indicates the broadcast root key. In some examples, the control signaling transmission component 1110 may transmit encrypted DCI that is encrypted based on a unicast key derived from the second key and a parameter. In some examples, the control signaling transmission component 1110 may transmit the control signaling that indicates the broadcast root key based on time information and a provisioned key. In some cases, the time information is a current time, a key refresh interval, or both.

The broadcast component 1115 may transmit an encrypted broadcast transmission that is encrypted based on a cell-specific key derived from the broadcast root key. In some examples, the broadcast component 1115 may transmit a second encrypted broadcast transmission that is encrypted based on a second cell-specific key derived from the second broadcast root key. The key indication component 1120 may transmit an indication of a second key based on access stratum security setup between the UE and the base station.

The encryption component 1125 may encrypt broadcast information to generate the encrypted broadcast transmission based on the cell-specific key that is derived from the broadcast root key and a cell global identity associated with the base station. In some examples, the encryption component 1125 may encrypt broadcast information to generate the encrypted broadcast transmission based on the cell-specific key that is derived from an intermediate key. In some cases, the intermediate key is derived based on the broadcast root key and an identifier of the base station. In some cases, the cell-specific key is further derived based on a cell identifier associated with the base station.

Figure 12:
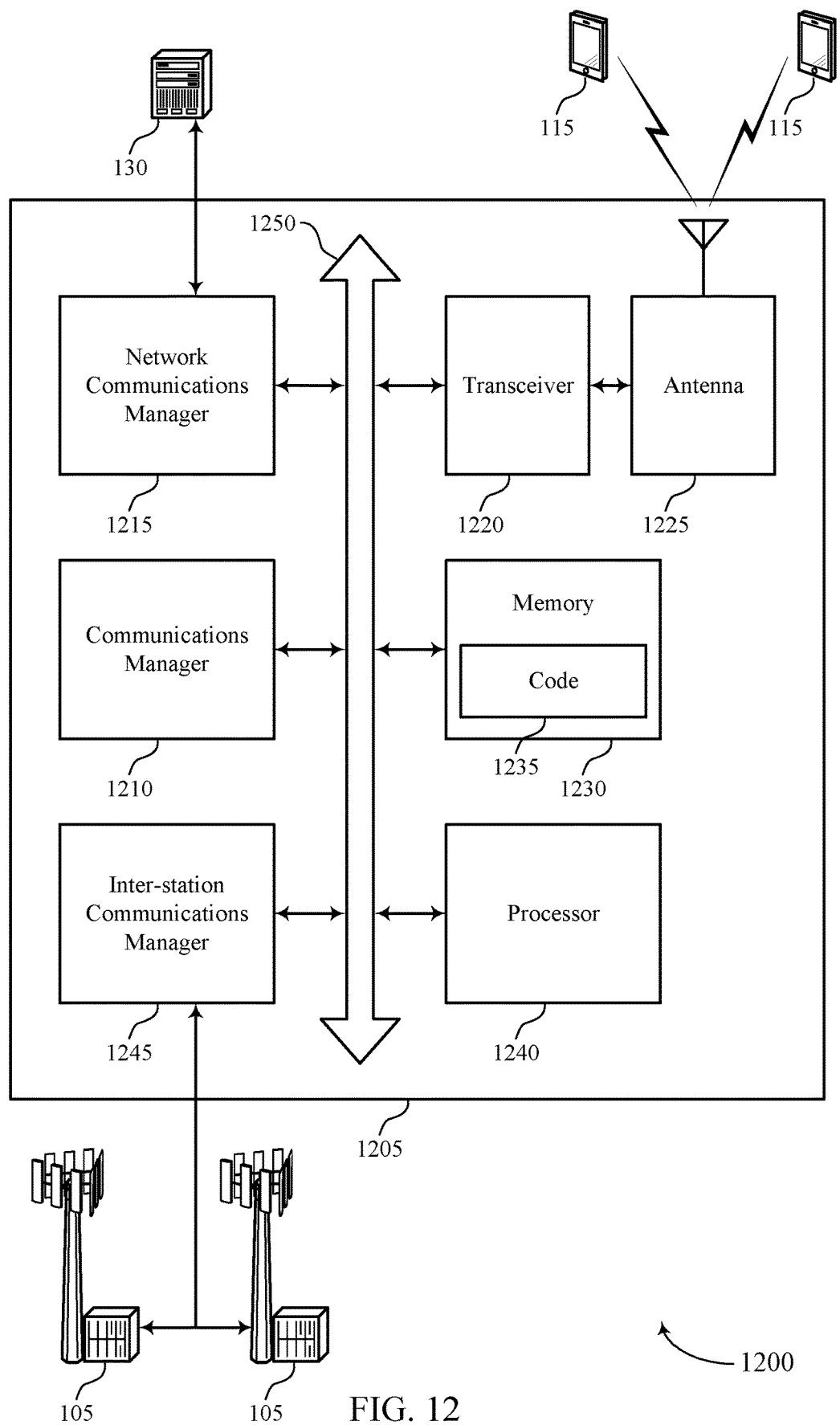
FIG. 12 shows a diagram of a system including a device that supports key provisioning for broadcast control channel protection in a wireless network in accordance with aspects of the present disclosure.

FIG. 12 shows a diagram of a system 1200 including a device 1205 that supports key provisioning for broadcast control channel protection in a wireless network in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, control signaling that indicates a broadcast root key and transmit an encrypted broadcast transmission that is encrypted based on a cell-specific key derived from the broadcast root key.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting key provisioning for broadcast control channel protection in a wireless network).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
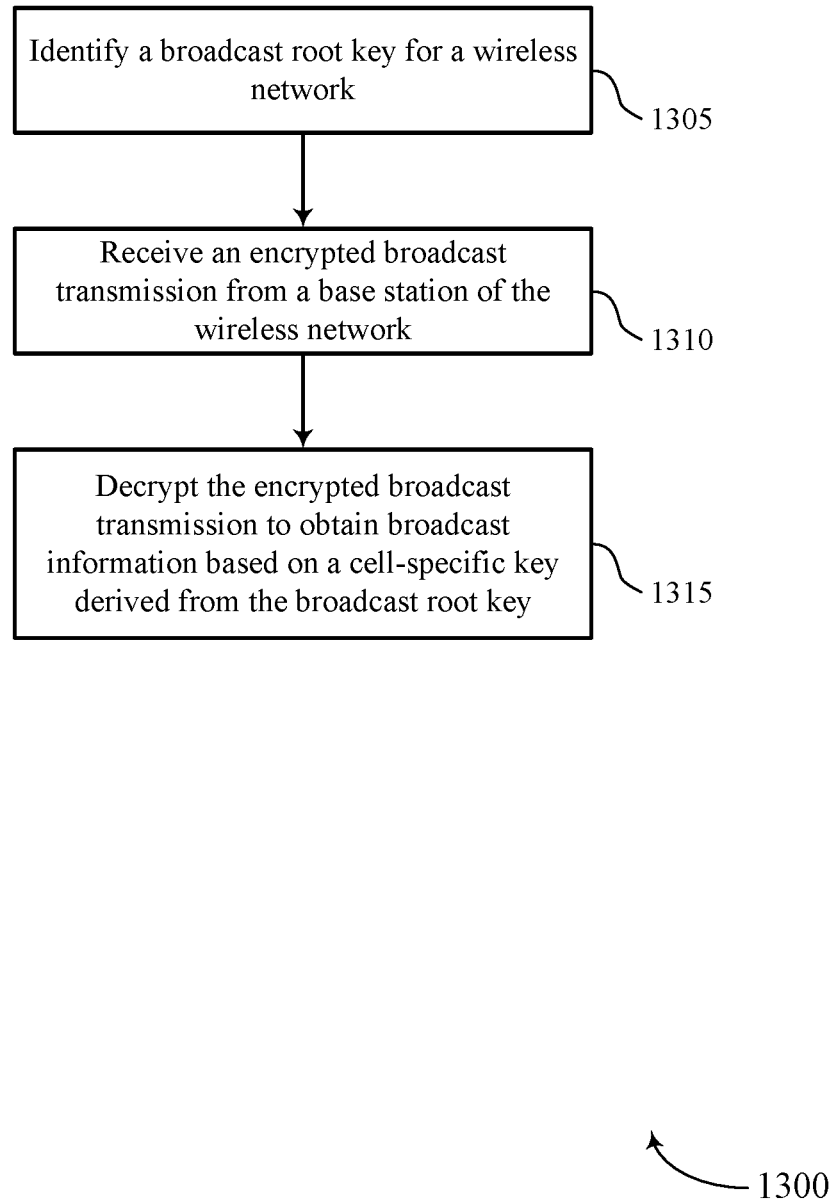
FIGS. 13 through 17 show flowcharts illustrating methods that support key provisioning for broadcast control channel protection in a wireless network in accordance with aspects of the present disclosure.

FIG. 13 shows a flowchart illustrating a method 1300 that supports key provisioning for broadcast control channel protection in a wireless network in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a broadcast root key for a wireless network. The operations of 1305 may be performed according to the methods described herein. In some examples, aspects of the operations of 1305 may be performed by a key identifier as described with reference to FIGS. 5 through 8.

At 1310, the UE may receive an encrypted broadcast transmission from a base station of the wireless network. The operations of 1310 may be performed according to the methods described herein. In some examples, aspects of the operations of 1310 may be performed by a broadcast reception component as described with reference to FIGS. 5 through 8.

At 1315, the UE may decrypt the encrypted broadcast transmission to obtain broadcast information based on a cell-specific key derived from the broadcast root key. The operations of 1315 may be performed according to the methods described herein. In some examples, aspects of the operations of 1315 may be performed by a decryption component as described with reference to FIGS. 5 through 8.

Figure 14:
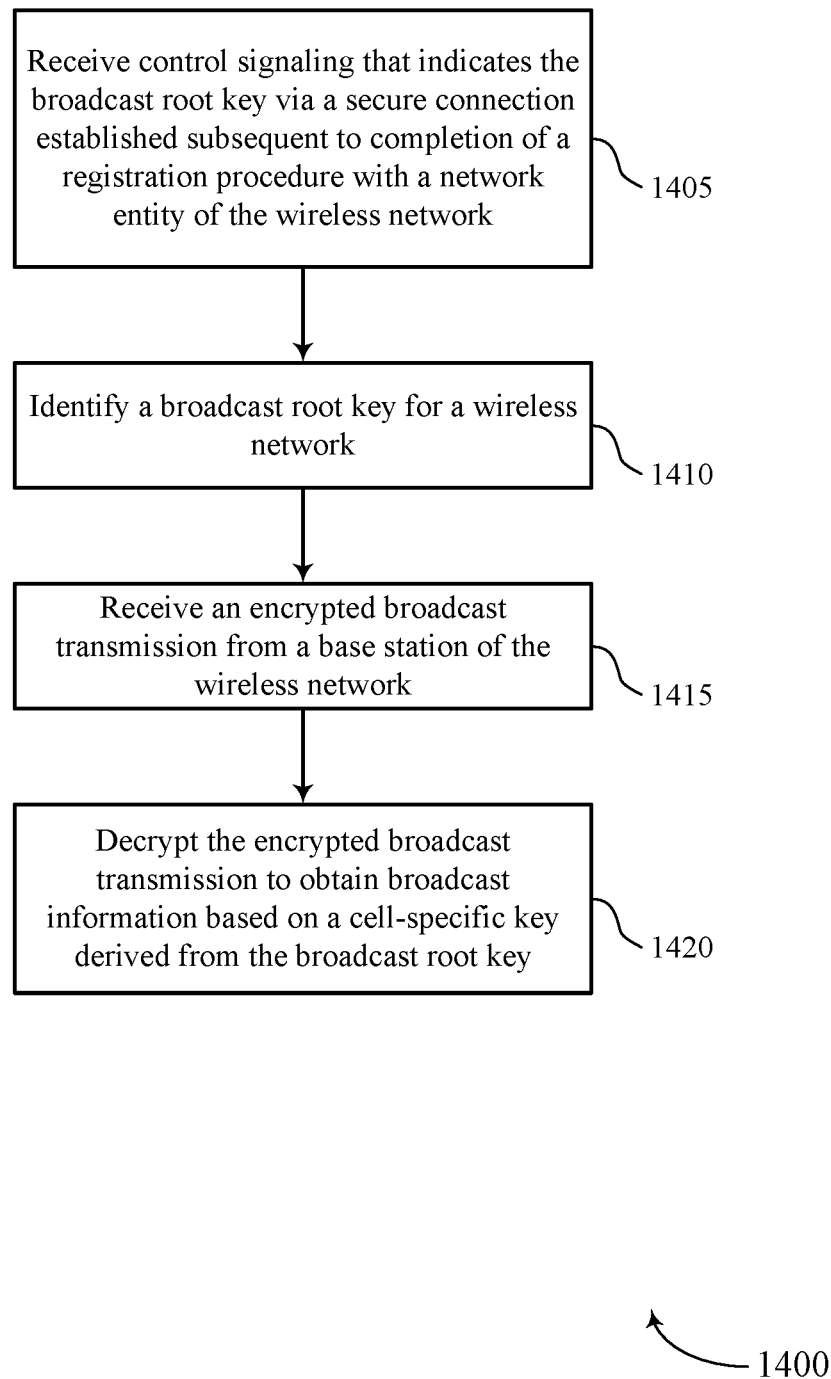

FIG. 14 shows a flowchart illustrating a method 1400 that supports key provisioning for broadcast control channel protection in a wireless network in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive control signaling that indicates the broadcast root key via a secure connection established subsequent to completion of a registration procedure with a network entity of the wireless network. The operations of 1405 may be performed according to the methods described herein. In some examples, aspects of the operations of 1405 may be performed by a control signaling component as described with reference to FIGS. 5 through 8.

At 1410, the UE may identify a broadcast root key for a wireless network. The operations of 1410 may be performed according to the methods described herein. In some examples, aspects of the operations of 1410 may be performed by a key identifier as described with reference to FIGS. 5 through 8.

At 1415, the UE may receive an encrypted broadcast transmission from a base station of the wireless network. The operations of 1415 may be performed according to the methods described herein. In some examples, aspects of the operations of 1415 may be performed by a broadcast reception component as described with reference to FIGS. 5 through 8.

At 1420, the UE may decrypt the encrypted broadcast transmission to obtain broadcast information based on a cell-specific key derived from the broadcast root key. The operations of 1420 may be performed according to the methods described herein. In some examples, aspects of the operations of 1420 may be performed by a decryption component as described with reference to FIGS. 5 through 8.

Figure 15:
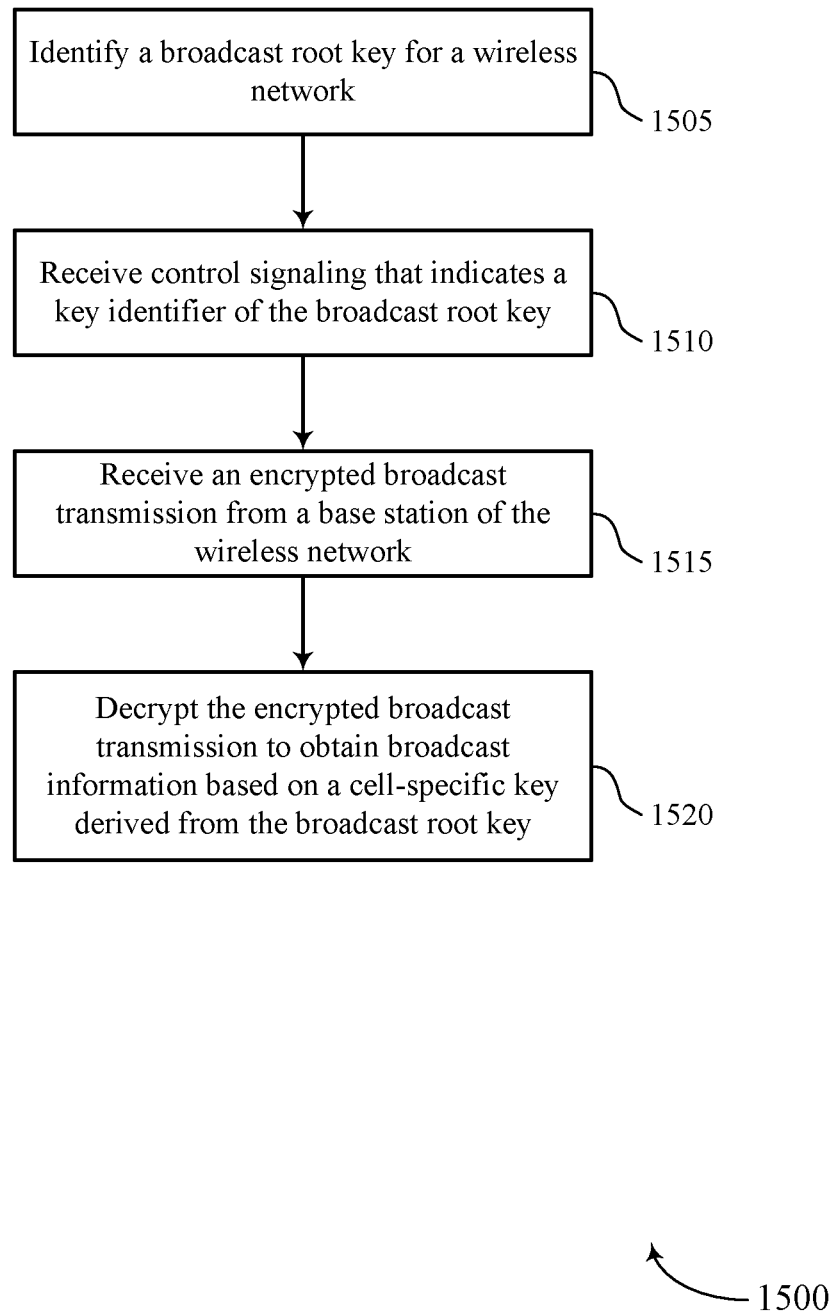

FIG. 15 shows a flowchart illustrating a method 1500 that supports key provisioning for broadcast control channel protection in a wireless network in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a broadcast root key for a wireless network. The operations of 1505 may be performed according to the methods described herein. In some examples, aspects of the operations of 1505 may be performed by a key identifier as described with reference to FIGS. 5 through 8.

At 1510, the UE may receive control signaling that indicates a key identifier of the broadcast root key. The operations of 1510 may be performed according to the methods described herein. In some examples, aspects of the operations of 1510 may be performed by a control signaling component as described with reference to FIGS. 5 through 8.

At 1515, the UE may receive an encrypted broadcast transmission from a base station of the wireless network. The operations of 1515 may be performed according to the methods described herein. In some examples, aspects of the operations of 1515 may be performed by a broadcast reception component as described with reference to FIGS. 5 through 8.

At 1520, the UE may decrypt the encrypted broadcast transmission to obtain broadcast information based on a cell-specific key derived from the broadcast root key. The operations of 1520 may be performed according to the methods described herein. In some examples, aspects of the operations of 1520 may be performed by a decryption component as described with reference to FIGS. 5 through 8.

Figure 16:
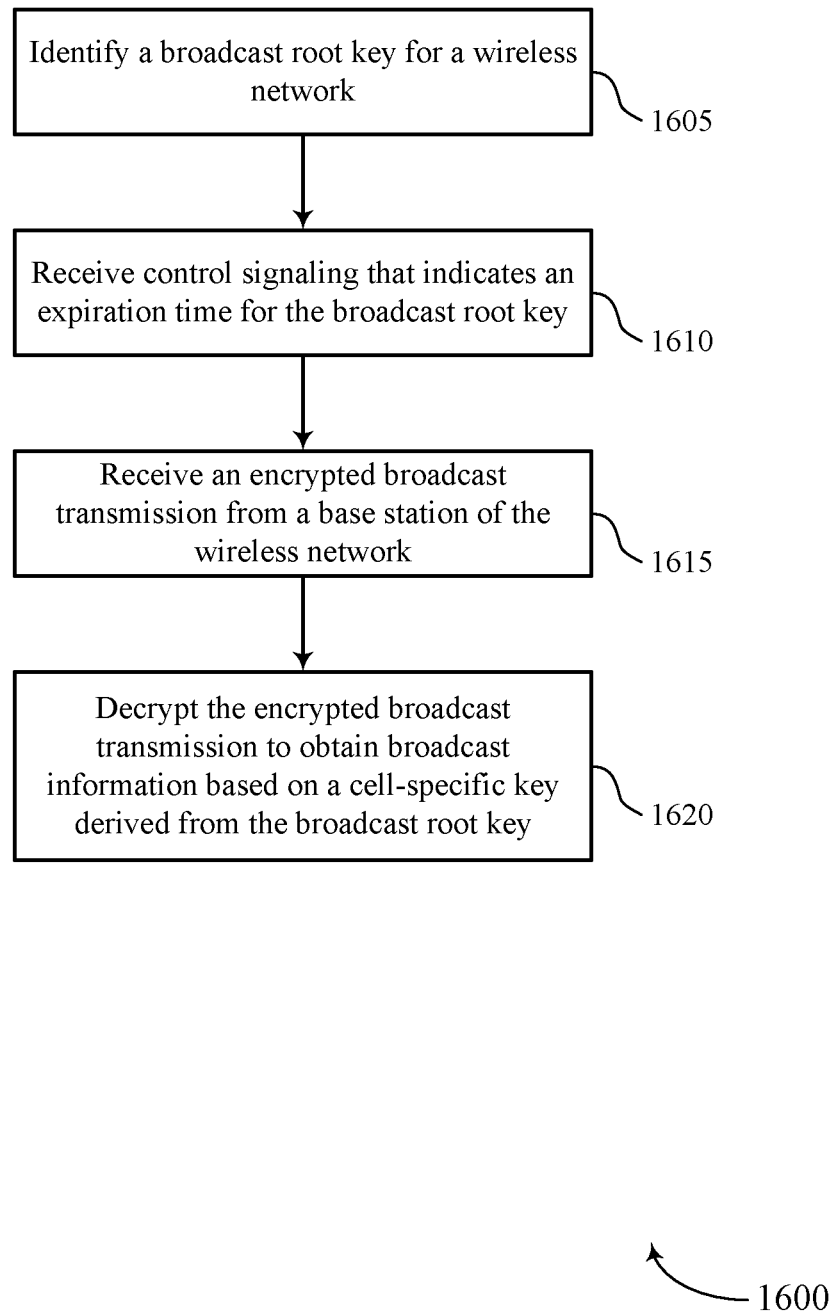

FIG. 16 shows a flowchart illustrating a method 1600 that supports key provisioning for broadcast control channel protection in a wireless network in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify a broadcast root key for a wireless network. The operations of 1605 may be performed according to the methods described herein. In some examples, aspects of the operations of 1605 may be performed by a key identifier as described with reference to FIGS. 5 through 8.

At 1610, the UE may receive control signaling that indicates an expiration time for the broadcast root key. The operations of 1610 may be performed according to the methods described herein. In some examples, aspects of the operations of 1610 may be performed by a control signaling component as described with reference to FIGS. 5 through 8.

At 1615, the UE may receive an encrypted broadcast transmission from a base station of the wireless network. The operations of 1615 may be performed according to the methods described herein. In some examples, aspects of the operations of 1615 may be performed by a broadcast reception component as described with reference to FIGS. 5 through 8.

At 1620, the UE may decrypt the encrypted broadcast transmission to obtain broadcast information based on a cell-specific key derived from the broadcast root key. The operations of 1620 may be performed according to the methods described herein. In some examples, aspects of the operations of 1620 may be performed by a decryption component as described with reference to FIGS. 5 through 8.

Figure 17:
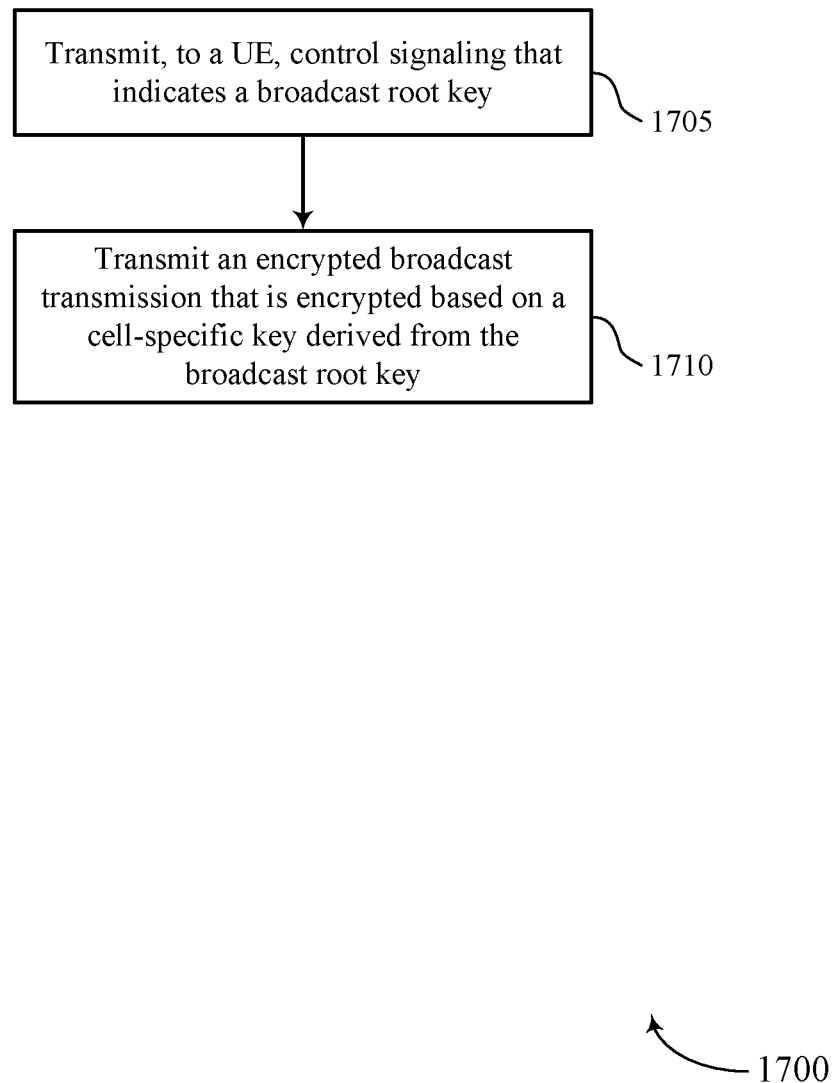

FIG. 17 shows a flowchart illustrating a method 1700 that supports key provisioning for broadcast control channel protection in a wireless network in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, control signaling that indicates a broadcast root key. The operations of 1705 may be performed according to the methods described herein. In some examples, aspects of the operations of 1705 may be performed by a control signaling transmission component as described with reference to FIGS. 9 through 12.

At 1710, the base station may transmit an encrypted broadcast transmission that is encrypted based on a cell-specific key derived from the broadcast root key. The operations of 1710 may be performed according to the methods described herein. In some examples, aspects of the operations of 1710 may be performed by a broadcast component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    identifying a broadcast root key for a wireless network;
    receiving an encrypted broadcast transmission from a network entity of the wireless network;
    decrypting the encrypted broadcast transmission to obtain broadcast information based at least in part on a cell-specific key derived from the broadcast root key and cell information associated with the network entity;
    receiving control signaling that indicates a second broadcast root key prior to expiration of an expiration time for the broadcast root key;
    receiving a second encrypted broadcast transmission from the network entity or a second network entity of the wireless network; and
    decrypting the second encrypted broadcast transmission to obtain second broadcast information based at least in part on a second cell-specific key derived from the second broadcast root key.

2. The method of claim 1, wherein identifying the broadcast root key comprises:
    receiving control signaling that indicates the broadcast root key.

3. The method of claim 1, wherein identifying the broadcast root key comprises:

receiving control signaling that indicates the broadcast root key via a secure connection established subsequent to completion of a registration procedure with a network entity of the wireless network.

4. The method of claim 1, wherein identifying the broadcast root key comprises:
receiving control signaling that indicates a key identifier of the broadcast root key.

5. The method of claim 1, wherein identifying the broadcast root key comprises:
receiving control signaling that indicates the expiration time for the broadcast root key.

6. The method of claim 1, wherein identifying the broadcast root key comprises:
receiving a registration accept message that indicates the broadcast root key.

7. The method of claim 1, further comprising:
receiving an indication of a second key based at least in part on access stratum security setup with the network entity;
identifying a parameter associated with the second key;
receiving encrypted downlink control information; and
decrypting the encrypted downlink control information to obtain downlink control information based at least in part on a unicast key derived from the second key and the parameter.

8. The method of claim 1, wherein identifying the broadcast root key comprises:
deriving the broadcast root key based at least in part on time information and a provisioned key.

9. The method of claim 8, wherein the time information is a current time, a key refresh interval, or both.

10. The method of claim 1, wherein decrypting the encrypted broadcast transmission comprises:
decrypting the encrypted broadcast transmission to obtain the broadcast information based at least in part on the cell-specific key that is derived from the broadcast root key and a cell global identity associated with the network entity.

11. The method of claim 1, wherein decrypting the encrypted broadcast transmission comprises:
decrypting the encrypted broadcast transmission to obtain the broadcast information based at least in part on the cell-specific key that is derived from an intermediate key.

12. The method of claim 11, wherein the intermediate key is derived based at least in part on the broadcast root key and an identifier of the network entity.

13. The method of claim 1, wherein the cell information comprises a cell identifier associated with the network entity.

14. A method for wireless communications by a network entity, comprising:
transmitting, to a user equipment (UE), control signaling that indicates a broadcast root key;
transmitting an encrypted broadcast transmission that is encrypted based at least in part on a cell-specific key derived from the broadcast root key and cell information associated with the network entity;
transmitting second control signaling that indicates a second broadcast root key prior to expiration of an expiration time for the broadcast root key; and
transmitting a second encrypted broadcast transmission that is encrypted based at least in part on a second cell-specific key derived from the second broadcast root key.

15. The method of claim 14, wherein transmitting the control signaling comprises:
transmitting the control signaling that indicates the broadcast root key via a secure connection established subsequent to completion of a registration procedure between the UE and a network entity.

16. The method of claim 14, wherein transmitting the control signaling comprises:
transmitting the control signaling that indicates a key identifier of the broadcast root key.

17. The method of claim 14, wherein transmitting the control signaling comprises:
transmitting the control signaling that indicates the expiration time for the broadcast root key.

18. The method of claim 14, wherein transmitting the control signaling comprises:
transmitting the control signaling that is a registration accept message that indicates the broadcast root key.

19. The method of claim 14, further comprising:
transmitting an indication of a second key based at least in part on access stratum security setup between the UE and the network entity; and
transmitting encrypted downlink control information that is encrypted based at least in part on a unicast key derived from the second key and a parameter.

20. The method of claim 14, wherein transmitting the control signaling comprises:
transmitting the control signaling that indicates the broadcast root key based at least in part on time information and a provisioned key.

21. The method of claim 20, wherein the time information is a current time, a key refresh interval, or both.

22. The method of claim 14, further comprising:
encrypting broadcast information to generate the encrypted broadcast transmission based at least in part on the cell-specific key that is derived from the broadcast root key and a cell global identity associated with the network entity.

23. The method of claim 14, further comprising:
encrypting broadcast information to generate the encrypted broadcast transmission based at least in part on the cell-specific key that is derived from an intermediate key.

24. The method of claim 23, wherein the intermediate key is derived based at least in part on the broadcast root key and an identifier of the network entity or the cell information comprises a cell identifier associated with the network entity.

25. An apparatus for wireless communications by a user equipment (UE), comprising: a processor, memory coupled with the processor; and instructions stored in the memory and executable by the processor to cause the apparatus to:
identify a broadcast root key for a wireless network;
receive an encrypted broadcast transmission from a network entity of the wireless network;
decrypt the encrypted broadcast transmission to obtain broadcast information based at least in part on a cell-specific key derived from the broadcast root key and cell information associated with the network entity;
receive control signaling that indicates a second broadcast root key prior to expiration of an expiration time for the broadcast root key;
receive a second encrypted broadcast transmission from the network entity or a second network entity of the wireless network; and
decrypt the second encrypted broadcast transmission to obtain second broadcast information based at least in part on a second cell-specific key derived from the second broadcast root key.

26. An apparatus for wireless communications by a network entity, comprising: a processor, memory coupled with the processor; and instructions stored in the memory and executable by the processor to cause the apparatus to:
- transmit, to a user equipment (UE), control signaling that indicates a broadcast root key;
- transmit an encrypted broadcast transmission that is encrypted based at least in part on a cell-specific key derived from the broadcast root key and cell information associated with the network entity;
- transmit second control signaling that indicates a second broadcast root key prior to expiration of an expiration time for the broadcast root key; and
- transmit a second encrypted broadcast transmission that is encrypted based at least in part on a second cell-specific key derived from the second broadcast root key.

* * * * *